US010313389B2

(12) United States Patent
Hovor et al.

(10) Patent No.: US 10,313,389 B2
(45) Date of Patent: *Jun. 4, 2019

(54) COMPUTER ASSET VULNERABILITIES

(71) Applicant: Accenture Global Services Limited, Dublin (IE)

(72) Inventors: Elvis Hovor, Clarksburg, MD (US); Shaan Mulchandani, Arlington, VA (US); Matthew Carver, Washington, DC (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/913,219

(22) Filed: Mar. 6, 2018

(65) Prior Publication Data
US 2018/0198815 A1    Jul. 12, 2018

Related U.S. Application Data

(63) Continuation of application No. 14/841,007, filed on Aug. 31, 2015, now Pat. No. 9,979,743.
(Continued)

(51) Int. Cl.
*G06F 11/00* (2006.01)
*H04L 29/06* (2006.01)

(52) U.S. Cl.
CPC .......... *H04L 63/1433* (2013.01); *H04L 63/14* (2013.01)

(58) Field of Classification Search
CPC ............................ H04L 63/1433; H04L 63/14
(Continued)

(56) References Cited

U.S. PATENT DOCUMENTS 6,173,284 B1    1/2001  Brown
6,704,874 B1    3/2004  Porras
(Continued)

FOREIGN PATENT DOCUMENTS

EP    2 051 468    10/2012
EP    2770688       8/2014
(Continued)

OTHER PUBLICATIONS

Canadian Office Action for Application No. 2,938,337 dated Mar. 19, 2018, 4 pages.
(Continued)

*Primary Examiner* — Mohammad W Reza
(74) *Attorney, Agent, or Firm* — Fish & Richardson P.C.

(57) ABSTRACT

Methods, systems, and apparatus, including computer programs encoded on computer storage media, for determining a network path between computer assets. One of the methods includes receiving an asset topology that includes an identifier for each computer-related asset that may be an entry point for an attack simulation, receiving threat data that identifies vulnerabilities of computer-related assets, determining a first computer-related asset that may be an entry point for an attack simulation, identifying one or more first vulnerabilities of the first computer-related asset, determining a path from the first computer-related asset to a second computer-related asset, determining one or more second vulnerabilities of the second computer-related asset, determining a probability that the second computer-related asset will be compromised by an adversary, and determining a change to the asset topology to reduce the probability that the second computer-related asset will be compromised by an adversary.

33 Claims, 7 Drawing Sheets

Related U.S. Application Data

(60) Provisional application No. 62/204,830, filed on Aug. 13, 2015.

(58) Field of Classification Search
USPC .......................................................... 726/25
See application file for complete search history.

(56) References Cited

U.S. PATENT DOCUMENTS

| | | | |
|---|---|---|---|
| 7,203,693 | B2 | 4/2007 | Carlbom et al. |
| 7,523,137 | B2 | 4/2009 | Kass et al. |
| 8,024,795 | B2 | 9/2011 | Newton |
| 8,272,061 | B1 | 9/2012 | Lotem et al. |
| 8,407,798 | B1 | 3/2013 | Lotem et al. |
| 8,463,790 | B1 | 6/2013 | Joshi et al. |
| 8,504,879 | B2 | 8/2013 | Poletto et al. |
| 8,516,104 | B1 | 8/2013 | Liu et al. |
| 8,538,911 | B2 | 9/2013 | Kass et al. |
| 8,832,832 | B1 | 9/2014 | Visbal |
| 8,966,639 | B1 | 2/2015 | Roytman et al. |
| 8,984,643 | B1 | 3/2015 | Krisher et al. |
| 9,118,617 | B1 | 8/2015 | Giroux et al. |
| 9,407,645 | B2 | 8/2016 | Modi et al. |
| 9,503,467 | B2 | 11/2016 | Lefebvre et al. |
| 2002/0078381 | A1 | 6/2002 | Farley |
| 2003/0033318 | A1 | 2/2003 | Carlbom et al. |
| 2003/0093514 | A1 | 5/2003 | Valdes et al. |
| 2003/0182310 | A1 | 9/2003 | Charnock et al. |
| 2004/0024738 | A1 | 2/2004 | Yamane et al. |
| 2004/0158479 | A1 | 8/2004 | Adhikari et al. |
| 2005/0071445 | A1 | 3/2005 | Siorek |
| 2005/0091542 | A1 | 4/2005 | Banzhof |
| 2005/0114493 | A1 | 5/2005 | Mandato et al. |
| 2005/0138413 | A1 | 6/2005 | Lippman et al. |
| 2005/0185823 | A1 | 8/2005 | Brown et al. |
| 2006/0230071 | A1 | 10/2006 | Kass et al. |
| 2007/0067848 | A1 | 3/2007 | Gustave et al. |
| 2007/0112941 | A2 | 5/2007 | Oliphant |
| 2008/0005796 | A1 | 1/2008 | Godwood |
| 2008/0109730 | A1 | 5/2008 | Coffman et al. |
| 2008/0229149 | A1 | 9/2008 | Roytman et al. |
| 2008/0295172 | A1 | 11/2008 | Bohacek |
| 2008/0307525 | A1 | 12/2008 | Nickle |
| 2009/0038015 | A1 | 2/2009 | Diamant et al. |
| 2009/0219154 | A1 | 9/2009 | Kukula |
| 2010/0071061 | A1 | 3/2010 | Crovella et al. |
| 2010/0180344 | A1 | 7/2010 | Malyshev |
| 2010/0223499 | A1 | 9/2010 | Panigrahy |
| 2011/0185421 | A1 | 7/2011 | Wittenstein |
| 2011/0185422 | A1 | 7/2011 | Khayam |
| 2012/0096549 | A1 | 4/2012 | Amini et al. |
| 2012/0123822 | A1 | 5/2012 | Hnatio |
| 2012/0173710 | A1 | 7/2012 | Rodriguez |
| 2012/0254088 | A9 | 10/2012 | Kass et al. |
| 2013/0019008 | A1 | 1/2013 | Jorgenson |
| 2013/0031635 | A1 | 1/2013 | Lotem et al. |
| 2013/0239177 | A1 | 9/2013 | Sigurdson et al. |
| 2013/0339341 | A1 | 12/2013 | Fan et al. |
| 2014/0157405 | A1 | 6/2014 | Joll |
| 2014/0157415 | A1 | 6/2014 | Abercrombie et al. |
| 2014/0172495 | A1 | 6/2014 | Schneck et al. |
| 2014/0189873 | A1 | 7/2014 | Elder et al. |
| 2015/0237062 | A1 | 8/2015 | Roytman et al. |
| 2015/0242637 | A1 | 8/2015 | Tonn et al. |
| 2015/0341379 | A1 | 11/2015 | Lefebvre et al. |
| 2016/0065598 | A1 | 3/2016 | Modi et al. |
| 2016/0065599 | A1 | 3/2016 | Hovor et al. |
| 2016/0188882 | A1 | 6/2016 | Mahrous et al. |
| 2016/0261640 | A1 | 9/2016 | Modi et al. |
| 2016/0352768 | A1 | 12/2016 | Lefebvre et al. |

FOREIGN PATENT DOCUMENTS

| | | |
|---|---|---|
| JP | 06250911 | 9/1994 |
| WO | WO 2005/107414 | 11/2005 |
| WO | WO 2005/111805 | 11/2005 |
| WO | WO 2011/095988 | 8/2011 |
| WO | WO 2013/014672 | 1/2013 |
| WO | WO 2013/109374 | 7/2013 |

OTHER PUBLICATIONS

European Office Action for Application No. 15,168,872.8 dated Apr. 13, 2018, 5 pages.

"Common Vulnerability Scoring System (CVSS)" wikipedia.org [online] retrieved on Jul. 15, 2015. Retrieved from the Internet: <URL: https://en.wikipedia.org/wiki/CVSS>, 8 pages.

"Common Vulnerability Scoring System v3.0: Specification Document," first.org [online]. Jun. 12, 2015 [retrieved on Jul. 15, 2015]. Retrieved from the Internet: <URL: https://www.first.org/cvss/cvss-v30-specification-v1.4.pdf>, 19 pages.

"Protect Your PEO," crowdstrike.com [online] retrieved on Jul. 15, 2015. Retrieved from the Internet: <URL: http://www.crowdstrike.com>, 2 pages.

"The KBMS-Prototype KRISYS User Manual" Dec. 1992 (Dec. 1992), p. 1-94.

Accenture, "Discover What Your Customers Really Think," 2 pages, Accenture 2005.

Allan et al.: "Taking Topic Detection From Evaluation to Practice" Proceedings of the 38th International Conference on System Sciences, Jan. 3, 2005 (Jan. 3, 2005), 10 pages.

Anonymous: "Characterizing Malware with MAEC and STIX," [Apr. 21, 2014]. Retrieved from: URL:http://stixproject.github.io/about/Chamcterizing_Malware_MAEC_and_STIX_v1.0.pdf [retrieved on Dec. 7, 2015] 8 pages.

Barnum, "Standardizing cyber threat intelligence information with the structured threat information eXpression (STIX)," Version 1.1; Revision 1, MITRE, Feb. 2014, 22 pages.

Bird and Loper, "NLTK: The Natural Language Toolkit," Proceedings of the ACL demonstration session, Barcelona, Association for Computational Linguistics, pp. 214-217. Jul. 2004.

Bird, "NLTK-Lite: Efficient Scripting for Natural Language Processing," Proceedings of the 4th International Conference on Natural Language Processing (ICON). pages 11-18, Kanpur, India. New Delhi: Allied Publishers. Dec. 2005.

Birnbaum et al., "Analogy, Intelligent IR, and Knowledge Integration for Intelligence Analysis" Ai Technologies for Homeland Security, Papers From the 2005 Aaai Spring Symposium, Mar. 21, 2005 (Mar. 21, 2005), XP002390865 Menlo Park, CA Retrieved from the Internet: URL:http://www.infolab.northwestern.edu/infolab/downloads/papers/paper10142.pdf> [retrieved on Jul. 19, 2006], 6 pages (Search Report).

Bloglines, Create a Personal Bloglines Page Loaded with the Freshest News About the Things You Love, 1p., 2003.

Chung and Mcleod: "Dynamic Topic Mining from News stream Data" COOPIS/DOA/ODBASE 2003, [Online] 2003, pp. 653-670, XP002391208 Retrieved from the Internet:URL:http://www.springerlink.com/(zb2dxr55xIjuq5453e2bnj55)/app/home/contribution.asp?referrer=parent&backto=issue,42,95;journal,1127,3908;linkingpublicationresults,1:10 5633,1> [retrieved on Jul. 19, 2006].

ClearforestText-Driven Business Intelligence, ClearForest Tagging & Extraction Platform, 2 pages, 2006.

Farnham et al., "Tools and Standards for Cyber Threat Intelligence Projects," SANs Institute InfoSec Ready Room, pp. 2-21 (Oct. 14, 2013).

Genalytics, Inc., "Building Next Generation Predictive Models Using Genetic Algorithm-based Software," <URL: http://genalytics.com>, 27 pages, 2003.

Genalytics, Inc., "Genalytics Auto: List Management Solution for Driving Successful Campaigns," 2 pages, 2006.

Genalytics, Inc., "Genalytics DB Extract: Advanced Data Extraction, Transformation and Scoring for Enterprise Data," 2 pages, 2006.

Genalytics, Inc., "Genalytics Knowledge Extract: Extract Meaning from Your Uninstructed Data," 2 pages, 2004.

Genalytics, Inc., "Genalytics Model, Leverage More Data, Create Better Models," 2 pages, 2006.

(56) References Cited

OTHER PUBLICATIONS

Genalytics, Inc., "Genalytics Phone: Phone Append our Reverse Look Up to Validate or Target your Prospects," 1 page, 2005.
Genalytics, Inc., "Genalytics Prospect, Automated Analytics and Targeted Analytics and Targeted Lists," 1 page, 2006.
Genalytics, Inc., "Taming the Analytic Data Monster: an Advanced Approach to Data Extraction and Transformation for Enterprise Analytics," 12 pages, 2004.
Intelliseek, Brandpulse Products, BrandPulse 360™, 2 pages, 1997-2006.
Intelliseek, Brandpulse Products, BrandPulse CRM™, 2 pages, 1997-2006.
Intelliseek, Brandpulse Products, BrandPulse Internet™, 2 pages, 1997-2006.
Intelliseek, Brandpulse Products, BrandPulse™ Direct, 2 pages, 1997-2006.
Intelliseek, Brandpulse Products, BrandPulse™ Overview, 2 pages, 1997-2006.
Inxight, "Inxight SmartDiscovery® Analysis Adapters and Connectors," 2 pages, Inxight Software Inc., 2005.
Inxight, "Inxight SmartDiscovery™ The Complete Solution for Enterprise Information Discovery," <URL:www.inxight.com> 4 pages, 2005.
Inxight, "Inxight ThingFinder Advanced with Custom Entity Extraction," 1 page, 2006.
Liu and Singh, "ConceptNet—a practical commonsense reasoning tool-kit" Bt Technol J; Bt Technology Journal Oct. 2004, [Online] vol. 22, No. 4, Oct. 2004 (Oct. 2004), pp. 211-226, XP002391209. Retrieved from the Internet: URL:http://web.media.mit.edu/{push/ Concept Net-BTTJ.pdf> [retrieved on Jul. 19, 2006].
Loper and Bird, "NLTK: The Natural Language Toolkit," Proceedings of the ACL Workshop on Effective Tools and Methodologies for Teaching Natural Language Processing and Computational Linguistics, Philadelphia, Association for Computational Linguistics, pp. 62-69. Jul. 2002.
Makkonen, "Investigations on Event Evolution in TDT" Citeseer, [Online] 2003, XP002391206. Retrieved From the Internet: URL:Http://Citeseer.Ist.Psu.Edu/706354.Htm 1> [Retrieved on Jul. 19, 2006], 6 pages.
McCallum, "Bow: A Toolkit for Statistical Language Modeling, Text Retrieval Classification and Clustering," 2 pages, Sep. 12, 1998.
McCallum, "Rainbow," 6 pages, Sep. 30, 1998.
Nallapati et al., "Event threading within news topics" Proceedings of the Thirteenth Acm Conference on Information and Knowledge Management (CIKM), [Online] 2004, pp. 446-453, XP002390646. Retrieved from the Internet: URL:http://www.cs.umass.edu/{nmramesh/p425-nallapati .pdf> [retrieved on Jul. 19, 2006].
Polepeddi, "Software Vulnerability Taxonomy Consolidation," Thesis, Jan. 5, 2005, 43 pages. Retrieved from the Internet: URL: http://www.osti.gov/bridge/product.biblio.jsp?osti_id=15020074 [retrieved on Nov. 2, 2007].
Soderland, "Learning information extraction rules for semi-structured and free text "Machine Learning Kluwer Academic Publishers Netherlands, [Online] vol. 34, No. 1-3, Feb. 1999 (Feb. 1999), pp. 233-272, XP002391210, ISSN: 0885-6125. Retrieved from the Internet: URL:http://www.springerlink.com/media/f62ciculncvnj23recn/contributions/m/2/3/n/m23n8197vg924t51.pdf> [retrieved on Jul. 19, 2006].
Srinivasan et al, "A self-organized agent-based architecture for power-aware intrusion detection in wireless ad-hoc networks," Computing & Informatics, IEEE 2006, 6 pages.
STIX, "Structured Threat Information eXpression—STIX—A structured language for cyber threat intelligenceinformation," MITRE, <URL: https://stix.mitre.org>, Jul. 2013, 2 pages.
Technorati™, "About Technorati, Currently Tracking 31 Million Sites and 2.2 Billion links," 1 page, 2006.
Yahoo! Inc., "Imagine all your favorite things on one page. That's My Yahoo!" www.yahoo.com. Sign in, 1page, 2006.
Yang et al., "Learning approaches for detecting and tracking news events" IEEE Intelligent Systems, [Online] vol. 14, No. 4, 1999, pp. 32-43, XP002391207. Retrieved from the Internet: URL:http://ieeexplore.ieee.org/ie15/5254/17016/00784083.pdf?tp=&arnumber=784083&isnumber=17016> [retrieved on Jul. 19, 2006].
Australian Office Action for Application No. 2016216520, dated May 11, 2017, 3 pages.
Australian Office Action for Application No. 2016216520, dated Oct. 7, 2016, 4 pages.
Australian Office Action for Application No. 2016219666, dated Apr. 07, 2017, 4 pages.
Australian Office Action for Application No. 2016219666, dated Oct. 14, 2016, 6 pages.
Australian Office Action for Application No. 2016247167, dated Dec. 20, 2016, 6 pages.
Canadian first Examiner's Report for Application No. 2,602,564 dated Mar. 1, 2013, 2 pages.
Canadian Office Action for Application No. 2,938,337, dated Jun. 21, 2017, 4 pages.
European Extended Search Report for Application No. 16184251.3, dated Jan. 5, 2017, 7 pages.
European Extended Search Report for Application No. 16186243.8, dated Nov. 15, 2016, 5 pages.
European Office Action for Application No. 16184251.3, dated Feb. 23, 2018, 4 pages.
European Patent Office dated Dec. 18, 2007 for co-pending European Patent Office Application No. 07253957.0, 8 pages.
European Patent Office dated Feb. 4, 2008 for co-pending European Patent Office Application No. 06 742 600.7, 3 pages.
Extended European Search Report in Application No. 15168872.8, dated Oct. 20, 2015, 6 pages.
Extended European Search Report in Application No. 15181386.2, dated Dec. 16, 2015, 10 pages.
Extended European Search Report in Application No. 15181400.1 dated Jan. 27, 2016, 7 pages.
Office Action in AU Application No. 2015202706, dated Mar. 8, 2016, 2 pages.
Office action in AU Application No. 2015202706, dated Oct. 30, 2015, 3 pages.
Office Action in AU Application No. 2015213316, dated May 6, 2016, 3 pages.
Office Action in AU Application No. 2015213391, dated May 15, 2016, 3 pages.
PCT International Preliminary Report on Patentability for Application No. PCT/EP2006/003533 dated Oct. 18, 2007, 13 pages.
PCT Notification of Transmittal of the International Search Report and the Written Opinion for International Application No. PCT/EP2006/003533 dated Sep. 8, 2006, 18 pages.
Srinivasan et al., "A system for power-aware agent-based intrusion detection (SPAID) in wireless ad hoc networks," Proceeding ICCNMC'05 Proceedings of the Third international conference on Networking and Mobile Computing, 2005, pp. 153-162.
U.S. Appl. No. 13/975,993, "Identifying and classifying non-functional requirements in text," Aug. 26, 2013, 56 pages.
U.S. Final Office Action for U.S. Appl. No. 11/387,173 dated Aug. 14, 2008, 16 pages.
U.S. Final Office Action for U.S. Appl. No. 12/405,026 dated Dec. 12, 2011, 21 pages.
U.S. Final Office Action for U.S. Appl. No. 14/285,487, dated Mar. 2, 2016, 24 pages.
U.S. Non-Final Office Action for U.S. Appl. No. 11/387,173 dated Feb. 22, 2008, 16 pages.
U.S. Non-Final Office Action for U.S. Appl. No. 12/405,026 dated May 4, 2011, 19 pages.
U.S. Non-Final Office Action for U.S. Appl. No. 14/285,487 dated Oct. 7, 2015, 22 pages.
U.S. Non-Final Office Action for U.S. Appl. No. 14/473,730 dated Aug. 23, 2015, 29 pages.
U.S. Non-Final Office Action for U.S. Appl. No. 14/473,743, dated Aug. 18, 2016, 18 pages.
U.S. Non-Final Office Action for U.S. Appl. No. 14/841,048, dated May 11, 2017, 40 pages.

(56) References Cited

OTHER PUBLICATIONS

U.S. Notice of Allowance for U.S. Appl. No. 11/387,173 dated Dec. 12, 2008, 19 pages.
U.S. Notice of Allowance for U.S. Appl. No. 12/405,026 dated Apr. 25, 2012, 13 pages.
U.S. Notice of Allowance for U.S. Appl. No. 12/405,026 dated Jun. 12, 2013, 21 pages.
U.S. Notice of Allowance for U.S. Appl. No. 14/285,487 dated Jun. 8, 2016, 14 pages.
U.S. Notice of Allowance for U.S. Appl. No. 14/841,048, dated Oct. 25, 2017, 17 pages.
U.S. Notice of Allowance for U.S. Appl. No. 15/155,328, dated Jan. 13, 2017, 18 pages.
U.S. Notice of Allowance for U.S. Appl. No. 15/235,247, dated Apr. 18, 2017, 12 pages.
U.S. Non-Final Office Action for U.S. Appl. No. 14/841,007, dated Jun. 15, 2017, 36 pages.
U.S. Notice of Allowance for U.S. Appl. No. 14/841,007, dated Dec. 20, 2017, 8 pages.

COMPUTER ASSET VULNERABILITIES

CROSS-REFERENCE TO RELATED APPLICATIONS

This application is a continuation (and claims the benefit of priority under 35 USC 120) of U.S. application Ser. No. 14/841,007, filed Aug. 31, 2015, which claims the benefit of U.S. Provisional Application Ser. No. 62/204,830, and filed on Aug. 13, 2015. Both of these prior applications are incorporated by reference in their entirety.

BACKGROUND

Some entities in the security industry face an increasing necessity to understand the impact and priorities of cyber threats against entities, while being constrained by limited resources to respond by adapting controls and validating patches. For instance, some threat actors and vectors have a significantly disproportionate growth and presence compared to that of practical, scalable remediation approaches.

SUMMARY

In general, one innovative aspect of the subject matter described in this specification can be embodied in methods that include the actions of receiving an asset topology that identifies an entity's computer-related assets, how the computer-related assets are connected together via one or more networks controlled by the entity, and an identifier for each computer-related asset that is an external facing asset, wherein the asset topology identifies one or more first computer-related assets each of which is an external facing asset and one or more second computer-related assets each of which is not an external facing asset, receiving threat data that identifies vulnerabilities of computer-related assets, determining, using the identifiers for the computer-related assets that may be an entry point for an attack simulation, a first computer-related asset that is one of the first computer-related assets, identifying, using the threat data, one or more first vulnerabilities of the first computer-related asset, determining, using the asset topology and the threat data, a path from the first computer-related asset to a second computer-related asset that is one of the second computer-related assets, determining, using the threat data, one or more second vulnerabilities of the second computer-related asset, determining, using the one or more second vulnerabilities of the second computer-related asset, a probability that the second computer-related asset will be compromised by an adversary's device, determining, using the asset topology and the threat data, a change to the asset topology to reduce the probability that the second computer-related asset will be compromised by an adversary's device, and providing information about the change to the asset topology for presentation to a user or implementing the change to the asset topology. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving an asset topology that identifies an entity's computer-related assets, how the computer-related assets are connected together via one or more networks controlled by the entity, and an identifier for each computer-related asset that may be an entry point for an attack simulation, wherein the asset topology identifies one or more first computer-related assets each of which is a potential entry point for an attack simulation and one or more second computer-related assets each of which is not a potential entry point for an attack simulation, receiving threat data that identifies vulnerabilities of computer-related assets, determining, using the identifiers for the computer-related assets that may be an entry point for an attack simulation, a first computer-related asset that is one of the first computer-related assets, identifying, using the threat data, one or more first vulnerabilities of the first computer-related asset, determining, using the asset topology and the threat data, a path from the first computer-related asset to a second computer-related asset that is one of the second computer-related assets, determining, using the threat data, one or more second vulnerabilities of the second computer-related asset, determining, using the one or more second vulnerabilities of the second computer-related asset, a probability that the second computer-related asset will be compromised by an adversary, determining, using the asset topology and the threat data, a change to the asset topology to reduce the probability that the second computer-related asset will be compromised by an adversary, and providing information about the change to the asset topology for presentation to a user or implementing the change to the asset topology. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include determining, for each of the first computer related assets and each of the second computer related assets, a path from the first computer related asset to the second computer related asset. The method may include receiving new threat data over a predetermined period of time, determining, using the new threat data, paths from the first computer related assets to the second computer related assets over the predetermined period of time, and determining trends in the paths from the first computer related assets to the second computer related assets over the predetermined period of time. Determining the trends in the paths from the first computer related assets to the second computer related assets over the predetermined period of time may include determining a recurring path of compromise that has a high probability that one or more assets on the recurring path will be compromised by an adversary's device over at least a threshold value of times during the predetermined period of time.

In some implementations, the method may include determining, using the trends in the paths from the first computer related assets to the second computer related assets, a probability that a particular second computer related asset will be compromised by an adversary's device over the predetermined period of time that is greater than probabilities that the other second computer related assets will be compromised by an adversary's device over the predetermined period of time, and determining, using the asset topology and the new threat data, a change to the asset topology to reduce the probability that the particular second computer related asset will be compromised by an adversary's device. The method may include providing information about the change to the asset topology for presentation to a user. The method may include implementing the change to the asset topology. Determining, using the asset topology and the new threat data, a change to the asset topology to reduce the probability that the particular second computer related asset will be compromised by an adversary's device may include determining a software update to apply to one of the computer related assets identified by the asset topology. Implementing the change to the asset topology may include applying the software update to the one of the computer related assets identified by the asset topology.

In some implementations, the method may include determining, for the one or more first vulnerabilities, a first probability that the vulnerability will be compromised by an adversary's device. Determining, using the asset topology and the threat data, the path from the first computer related asset to the second computer related asset may include determining, for each computer related asset on the path between the first computer related asset and the second computer related asset, one or more vulnerabilities for the computer related asset, and determining, for the one or more vulnerabilities of the computer related asset, corresponding probabilities that the computer related asset will be compromised by an adversary's device. The method may include for at least one of the computer related assets on the path between the first computer related asset and the second computer related asset: determining, using the asset topology, all of subsequent computer related assets directly connected to the computer related asset not including any computer related assets used to access the computer related asset, determining, for each of the subsequent computer related assets, one or more vulnerabilities of the subsequent computer related asset, determining, for each of the subsequent computer related assets using the vulnerabilities of the subsequent computer related asset, a probability that the subsequent computer related asset will be compromised by an adversary's device, and selecting a particular subsequent computer related asset with the probability greater than the probabilities of the other subsequent computer related assets as the next computer related asset in the path between the first computer related asset and the second computer related asset. Determining, using the one or more vulnerabilities of the second computer related asset, the probability that the second computer related asset will be compromised by an adversary's device may include determining, using the path from the first computer related asset to the second computer related asset, the first probability, and the one or more second vulnerabilities of the second computer related asset, the probability that the second computer related asset will be compromised by an adversary's device.

In some implementations, determining the probability that the second computer related asset will be compromised by an adversary's device may include determining a score that represents the probability. Determining the probability that the second computer related asset will be compromised by an adversary's device may include determining a percentage probability. Determining the probability that the second computer related asset will be compromised by an adversary's device may include determining, for each of the vulnerabilities of the second computer related asset, a particular probability, and combining all of the particular probabilities for the vulnerabilities of the second computer related to determine the probability that the second computer related asset will be compromised by an adversary's device. The method may include providing the probability for presentation to a user. Receiving the asset topology that identifies the entity's computer related assets may include receiving data input by a user that identifies the asset topology. Receiving the asset topology that identifies the entity's computer related assets may include analyzing one or more computer networks of the entity to determine the asset topology.

In some implementations, receiving the asset topology that identifies the entity's computer related assets may include receiving the asset topology that identifies the one or more first computer related assets each of which is directly connected to a network that is not controlled by the entity without intervening hardware and the one or more second computer related assets each of which is not directly connected to a network that is not controlled by the entity. Receiving the asset topology that identifies the entity's computer related assets may include receiving the asset topology and an identifier for at least one of the first computer related assets that is directly connected to the Internet. Receiving the asset topology that identifies the entity's computer related assets may include receiving the asset topology and an identifier for at least one of the first computer related assets that is a wireless router.

In some implementations, the method may include determining, for each of the computer-related assets, a category to which the computer-related asset belongs, determining, for a particular category from the determined categories, paths from an external facing asset to each of the assets in the category, and determining, using the paths from the external facing asset to each of the assets in the category, a category probability of compromise for the particular category. The method may include comparing the category probability of compromise for the particular category with a second category probability of compromise for a second category, ranking the particular category and the second category using the category probability of compromise and the second category probability of compromise, and generating instructions for the presentation of a user interface that includes the ranking of the particular category and the second category. Determining, for each of the computer-related assets, the category to which the computer-related asset belongs may include determining, for each of the computer-related assets, a business function of the entity to which the computer-related asset belongs, and determining, for the particular category from the determined categories, the paths from the external facing asset to each of the assets in the category may include determining, for a particular business function from the determined business functions, the paths from the external facing asset to each of the assets in the category. The method may include determining, for the particular business function, an overall probability of impact to the particular business function using probabilities that the computer-related assets which belong to the particular business function will be compromised by an adversary's device. Determining, for each of the computer-related assets, the category to which the computer-related asset belongs may include determining, for each of the computer-related assets, the category to which the computer-related asset belongs using a network topology of the computer-related assets.

In some implementations, the method may include determining a particular computer-related asset or a type of computer-related assets that are a potential target of an attack by the adversary's device, wherein determining the path from the first computer related asset to the second computer related asset that is one of the second computer related assets may include determining a path from the first computer-related asset to the particular computer-related asset, or determining a path from the first computer-related asset to the second computer related asset that includes at least one computer-related asset of the type of computer-related assets that are a potential target of the attack. Determining the particular computer-related asset or the type of computer-related assets that are the potential target of an attack by the adversary's device may include determining the particular computer-related asset or the type of computer-related assets that are the potential target of an attack by the adversary's device using the threat data. Determining the particular computer-related asset or the type of computer-related assets that are the potential target of an attack by the adversary's device may include determining the type of computer-related assets that support a particular business function of an entity. The method may include determining a type of computer-related assets that are a potential target of an attack by the adversary's device, wherein determining the path from the first computer related asset to the second computer related asset that is one of the second computer related assets may include determining a path from the first computer-related asset to the second computer related asset that includes only computer-related asset of the type of computer-related assets that are a potential target of the attack, both the first computer-related asset and the second computer related asset being of the type of computer-related assets that are a potential target of the attack.

The subject matter described in this specification can be implemented in particular embodiments and may result in one or more of the following advantages. In some implementations, a system may use threat data and an asset topology to determine how to change the asset topology most effectively, e.g., when a new asset should be placed in the asset topology. In some implementations, a system as described below may determine whether security assets, e.g., firewalls or intrusion detection systems, are being utilized optimally or if certain configuration changes result in a reduced probability of attack, e.g., a reduced attack surface. In some implementations, a system as described below may verify that desired or implemented security policies are in effect, e.g., for audit or compliance purposes. In some implementations, a system as described below may determine whether certain assets should be reconfigured or eliminated, e.g., without affecting business objectives, to reduce a probability of attack, e.g., result in a reduced attack surface. In some implementations, a system as described below may determine where gaps in system defenses exist that may not be further mitigated by existing security assets or solutions. The system may utilize gap information to determine how to allocate or prioritize, or both, budgets for new security solutions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
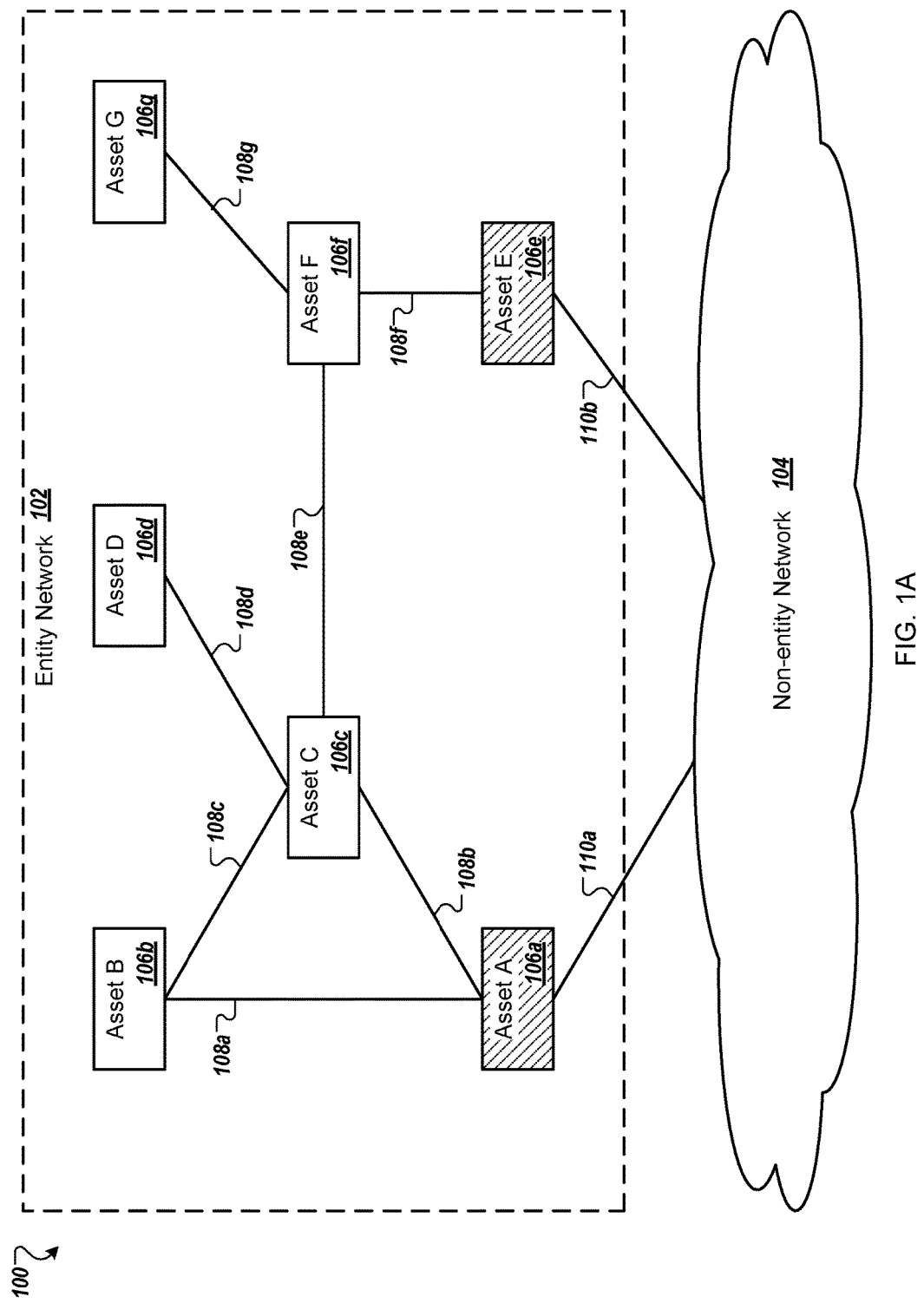
FIGS. 1A-B show an asset topology for an entity that includes an entity network and a non-entity network.

A system may receive threat data, describing asset vulnerabilities, ways in which those vulnerabilities are exploited, frequencies of exploit utilization and success, and likely paths of compromise, and receive data that defines assets of an entity and which assets provide access to which of the other assets of the entity, e.g., an asset topology. The assets may be hardware, software, accounts, e.g., user accounts, and other types of assets. The assets may be publicly accessible or discoverable, e.g. a web portal served by one or more applications, or a server that can be accessed remotely via SSH. In some examples, a system may include mechanisms to restrict access to at least some of the assets to a specific set of people. The system uses the threat data to simulate attacks on the assets starting with assets that are accessible from networks that are not managed by the entity or assets that are otherwise accessible to people who do not work for the entity, e.g., wireless routers or web based accounts.

The system simulates an attack by determining the probability that a particular asset will be attacked and the probability that an attack will be successful. For instance, the system may select a particular external facing asset, that is connected to an external network or is otherwise accessible to people who do not work for the entity, and determines, using the threat data, the probability that vulnerabilities of the particular external facing asset will be compromised by an adversary. The system determines the assets connected to the particular external facing asset and, for each of those assets, may determine probabilities that the assets will be targeted by the adversary. The system determines, using the threat data, probabilities that each of those assets will be compromised by an adversary. In some implementations, the probabilities that those assets will be targeted may be based on or related to the probabilities that the assets will be compromised, e.g., an asset with a higher probability of being compromised may have a higher probability of being targeted.

The system determines the probabilities for multiple assets, making a "path" through the assets from the particular external facing asset to a current asset, e.g., an asset currently being analyzed by the system. The system uses the path to determine particular weaknesses in the asset topology for the entity. The system may use a path, or multiple paths determined during a single simulation or multiple simulations, to determine where a new asset should be placed in the asset topology, such as a firewall to provide additional protection for a particular critical asset of the entity, or likely paths that an adversary may take if they gain access to the entity's assets.

When performing multiple simulations, the system may receive new threat data over time indicating changes to the threats of the entity's assets and other assets. The system may model the changes to the vulnerabilities or paths of attack, or both, over time and present the model or information about the model to a user. In some implementations, the system may use the model to determine recommended changes to the entity's assets, such as new policies, new assets that should be acquired by the entity, or a particular location in the asset topology at which to place a particular asset that will maximize the efficiency or benefits provided by the particular asset, such as a firewall.

In some implementations, a system may build a cyber-risk model using current threat intelligence data and information about assets and their interdependencies through a software defined infrastructure. The system may use a multi-dimensional probabilistic approach to determine potential paths of compromise that pose the greatest risk, the business impacts of the paths of compromise to an entity, and prioritized, contextualized courses of action that are actionable, given resource constraints, to reduce the risk of potential paths of compromise.

The system may create an asset topology and use the asset topology with threat data to determine an asset threat model. The asset threat model may indicate assets, categories, priorities of assets, asset degrees of separation from an edge, e.g., a network edge, vulnerabilities, and severities of the vulnerabilities. Categories may represent how assets align with or map to business processes used by an entity. For instance, a particular server may be used for human resources or payroll operations and the system may associate the particular server with a corresponding human resources category. The categories may indicate a priority of the corresponding assets. For example, assets assigned to the human resources category may have personally identifiable information and a high priority for protection.

In some implementations, the asset topology may be a hierarchical, interconnected, graph that shows relationships between an entity's assets. The system may assign each asset a functional category and a priority, e.g., based on importance to the entity. The system may use exploit targets to determine a quantity and a severity of vulnerabilities; incidents to determine a probability of attack severity and success; and adversary tactics, techniques, and procedures (TTPs) to determine attack paths and prioritizations of the attack paths.

In some implementations, a system may use adaptive Markov Chain Monte Carlo (MCMC) simulations. The system may determine, using the simulations or some of the simulations, information about how various factors impact the simulation, number of simulations runs used to analyze particular paths or vulnerabilities or both, and success probabilities of an attack, e.g., an overall probability for an attack or that particular assets are attacked or compromised or both. Some implementations of the factors that impact the simulation may include an asset's degrees of separation from the edge, severity and recency of vulnerabilities, and indicator or observable confidence. For instance, the system may determine to perform more simulations that take advantage of more severe vulnerabilities than simulations that take advantage of less severe vulnerabilities, e.g., in an exponentially deceasing manner.

The system may use the simulations to determine an impact and probability of simultaneous breaches, compromise-latency based on multiple assets succumbing to the same or similar vulnerabilities, or both. The system may use previous knowledge, e.g., determined from previous simulations, in multi-step attacks that is characteristic of an ergodic system to determine probabilities of an attack, probabilities of comprise of particular assets, or both. The system may determine potential paths of compromise that pose the greatest risk, impact to the business, and prioritized courses of action that can be acted upon based on contextualized, severe vulnerabilities. In some implementations, the system may use contextualized threat intelligence information to generate attack vectors, and how the attack vectors may be used to compromise assets.

Figure 1B:
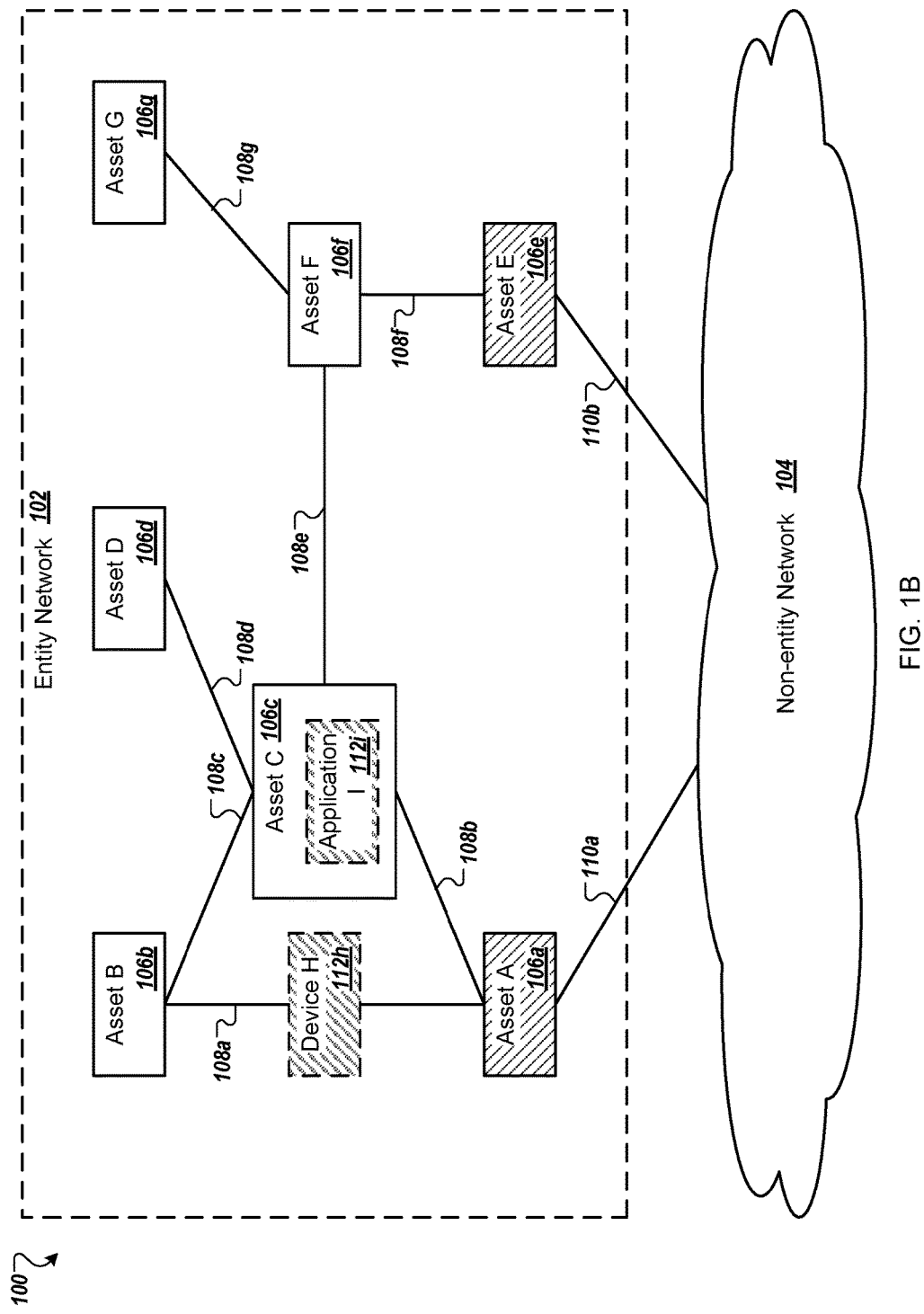

FIGS. 1A-B show an asset topology 100 for an entity that includes an entity network 102 and a non-entity network 104. In some implementations, the asset topology 100 may include only information about the entity network 102. A system may use the asset topology 100 to determine whether new assets, such as Device H and Application I or particular software applications, should be added to the entity's assets in the entity network 102 and where the assets should be located in the entity network 102 to eliminate potential paths of compromise, reduce the probability that a particular asset, such as asset B, will be targeted or compromised, or a combination of these.

For example, as shown in FIG. 1A, the asset topology 100 includes multiple assets A-G 106a-g owned by the entity and connections 108a-g between the assets. The connections may represent physical connections, when two devices physically connect to each other, or virtual connections, when a particular type of account allows access to a particular device, e.g., a particular server, or a first asset resides on another asset, e.g., a software application on a computer.

The asset topology 100 includes one or more external facing assets, such as asset A 106a and asset E 106e, which may connect to the non-entity network 104, e.g., the Internet, via external connections 110a-b or which otherwise provide external access to the entity network 102, e.g., such as a user account that allows external access to a physical asset. For example, the asset E 106e may be a wireless router in the entity network 102 and not directly connect to the non-entity network 104. An adversary's computer may compromise the asset E 106e by finding a broadcast of the wireless router, determining vulnerabilities of the wireless router, and using some of those vulnerabilities to gain access to the wireless router.

A system, not shown, analyzes the asset topology 100 using threat data, described in more detail below, to determine potential vulnerabilities of the assets A-G 106a-g. For instance, the system analyzes each of the external facing assets to determine the vulnerabilities of the external facing assets, probabilities that a device operated by an adversary may use one of the vulnerabilities, probabilities that a device operated by an adversary may gain access to an asset using one of the vulnerabilities, overall probabilities that an external facing asset will be targeted by an adversary's device or compromised by an adversary's device using the vulnerabilities, or a combination of two or more of these.

In some implementations, the system may determine a probability that each of the external facing assets, and for other assets in the asset topology 100, that the asset will be targeted by an adversary's device. For instance, the system may use the probability that a particular external facing asset will be compromised and an importance of the particular external facing asset, to determine the probability that the particular external facing asset will be targeted. The system may determine, for each of the external facing assets, how many vulnerabilities each of the assets has and the severity of each of those vulnerabilities. The system may use the number of vulnerabilities, the severity of the vulnerabilities, and the importance of the asset to determine the probability that the asset will be targeted. The importance of the asset may be estimated, e.g., based on the type of asset or data associated with the asset—to which the asset provides access, information received from a user, or any other appropriate method to determine the importance of the asset.

In some examples, the system simulates a path through the assets A-G 106a-g that may include one or more backtracks. For instance, the system may determine that the only asset connected to a current asset is the asset which the system used to get to the current asset. The system may determine that for the current asset G 106g, the only connected asset is the asset F 106f, and move back to the asset F 106f to determine another route through the entity network 102. In some examples, the system may determine that for the current asset, all of the connected assets are on the current path through the entity network 102 and determine another route through the entity network 102.

The system may select one of the external facing assets, such as the asset A 106a, using the probabilities, e.g., the asset with the highest probability of compromise, and generate a simulated environment in which the system identifies all of the assets connected to the selected external facing asset, e.g., the assets B-C 106b-c, probabilities of being targeted, compromised, or both, for those assets, and so on, to determine a path through the entity network 102 that an adversary's device may take to gain access to some of the entity's assets 106a-e. In some implementations, the system may use Markov Chain Monte Carlo methods to determine which of the external facing assets to select. In some implementations, the system may use Markov Chain Monte Carlo methods to determine which vulnerability of a particular asset should be compromised during an attack simulation.

In some implementations, the system may use Markov Chain Monte Carlo methods to determine how to distribute a level of effort of an adversary's device in attempting to compromise assets. For instance, the system may determine a distribution for attack simulations using the probability of compromise, how many times an adversary's device may try to attack particular assets, e.g., based on the importance of the asset, or both.

For instance, when an adversary's device compromises asset A and determines that assets B-E are connected to asset A, the system may determine a number of simulations to perform attacks on each of those assets. In some examples, when the system performs about ten thousand simulations, the system may determine to model the adversary devices' tactics by performing three thousand simulations attacking asset B, two thousand simulations attacking asset C, five thousand simulations attacking asset D, and no simulations attacking asset E. In these examples, the adversary's device may place a significant amount of effort, e.g., half, trying to compromise asset D, and attempt to compromise assets B and C to see if the device may gain access to asset B or asset C.

For each particular asset that the system analyzes, the system may determine which other assets in the entity network 102 are connected to the particular asset and probabilities for those other assets. The system selects one of those assets to create a path through the entity network 102. The selected asset may have the greatest probability of being targeted, the greatest probability of being compromised, or both. In some implementations, the system selects one of the assets using Markov Chain Monte Carlo methods.

The system may use information from a simulation, or multiple simulations, to determine weaknesses in the entity network 102. For instance, the system may determine that the asset B 106b is a high priority asset, e.g., contains confidential information for the entity, and that one or more changes to the entity network 102 will reduce the probability that an adversary's device will compromise the asset B 106b. The system may determine the priority of the assets in the entity network 102 using information received from the entity, analysis of the asset topology 100 or any other appropriate method. In some examples the priority of an asset may represent an importance of the asset to the entity.

As shown in FIG. 1B, the system may determine that a device H 112h should be placed on the connection 108a between the asset A 106a and the asset B 106b to reduce the probability that the asset B 106b will be compromised. The system may determine that an application I 112i should be installed on the asset C 106c to reduce the probability that the asset B 106b will be compromised. In some examples, the system may determine multiple changes to the asset topology 100 to reduce the probability that the asset B 106b will be compromised and determine which option or options should be implemented, e.g., to most reduce the probability, given budget constraints, etc.

For instance, the system may determine that the probability the asset B 106b will be compromised is twenty-two percent and that installation of the device H 112h in the entity network 102 will reduce the probability to thirteen percent. The system may determine that installation of the application I 112i on the asset C 106c will reduce the probability that the asset B 106b will be compromised to eighteen percent. The system may determine that installation of both the device H 112h and the application I 112i will reduce the probability to eleven percent. The system may use the cost of the installation of the device H 112h, the application I 112i, or both, the importance or priority of the asset B 106b, with respect to the entity, other features of the entity network 102, or a combination of these, to determine a recommendation for a change to the entity network 102.

In some implementations, the system may determine that the asset B 106b, the asset D 106d, and the asset G 106g are all high priority, e.g., the same or different priorities. The system may determine that installation of the application I 112i on the asset C 106c provides the greatest benefit to the entity given that the application I 112i will reduce the probabilities that both the asset B 106b and the asset D 106d will be targeted, compromised, or both, by an adversary's device, e.g., as compared to installation of the application I 112i on the asset F 106f which will reduce the probability for the asset G 106g and not the asset B 106b or the asset D 106d. The system may determine that the connection 108a should be removed, e.g., in addition to the installation of the application I 112i on the asset C 106c, to reduce the probability that the asset B 106b will be targeted, compromised, or both.

The system may determine one or more changes to the entity network 102 using the results of a simulation, e.g., in which the system determines a path of through the asset topology 100. The changes may be changes to settings for one or more of the assets 106a-g, the addition of one or more assets to the entity network 102, or the removal of an asset from the entity network 102. In some examples, the system may determine that one or more network security devices, e.g., firewalls, intrusion detection systems, or intrusion prevention systems, should be purchased and installed. The system may determine that one or more connections should be removed from the entity network 102, one or more connections should be added to the entity network 102, or both, to reduce the probability that an asset may be targeted, compromised, or both, by an adversary's device. The system may identify a software update or a new software application to replace a different, potentially related software application.

In some implementations, the system may simulate a computer based attack on the entity network multiple times, e.g., determine multiple paths through the asset topology. For example, the system may determine which of the non-external facing assets, e.g., the asset B 106*b*, the assets C-D 106*c-d*, and the assets F-G 106*f-g*, are an attack target for the simulation. The system may use the asset priorities, vulnerabilities, compromise history information, value, ease of compromise, or a combination of two or more of these to determine which asset is the attack target for a particular simulation. Compromise history information may include historical data about compromises of particular assets, particular types of compromises, related types of compromises, or other types of historical compromise data.

The system may perform multiple simulations to determine recurring paths of compromise through the entity network 102. For instance, the system may receive additional threat data over time, e.g., as new vulnerabilities in various assets are identified, and perform additional simulations using the additional threat data. The system may analyze the multiple paths each from a different simulation to determine high risk paths, e.g., that have a high probability of occurring given the threat data or occurred most frequently, high risk assets, e.g., that have the highest probability of being compromised, or both.

In some implementations, the asset topology 100 represents a closed network, e.g., that does not connect to the non-entity network 104. For instance, the system may analyze a closed asset topology to determine paths of compromise when an adversary has access to one of the physical assets in the entity network 102, such as a computer, Ethernet port, or another hardware component in the entity network 102. In these implementations, the adversary's device may be one of the assets in the entity network 102. For instance, the system may determine a probability that an adversary will gain access to a computer represented by the asset A 106*a*, e.g., the adversary's device, and then gain access to other assets owned by the entity.

Figure 2:
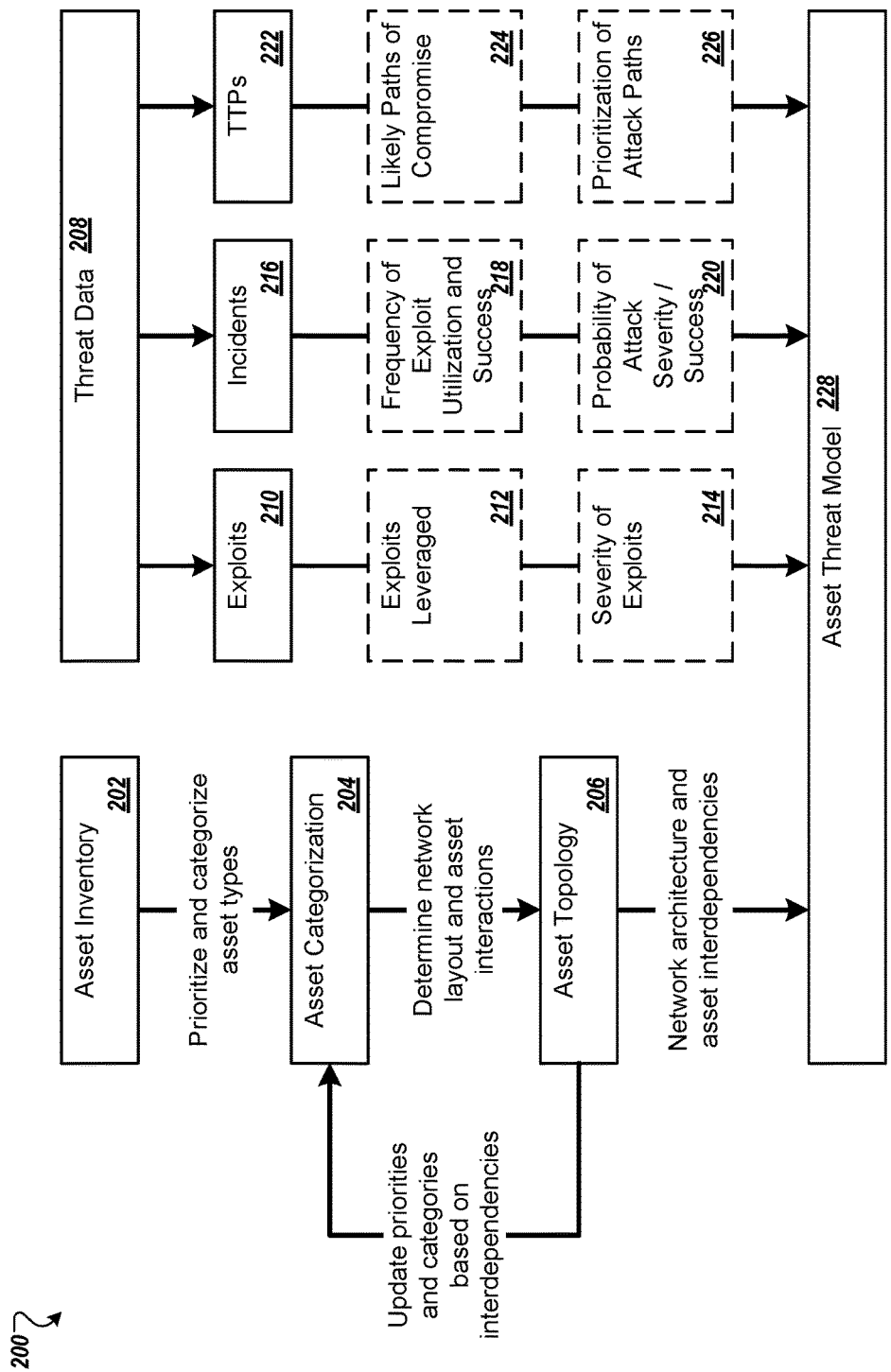
FIG. 2 shows an environment in which a system generates as asset threat model using an asset inventory and threat data.

FIG. 2 shows an environment 200 in which a system generates as asset threat model 228 using an asset inventory 202 and threat data 208. The system receives the asset inventory 202 that identifies assets owned by an entity, e.g., a company or organization.

The system prioritizes and categorizes the assets to create an asset categorization 204. The system may categorize each of the assets to perform automated analysis on the data stored on the assets and to determine a type of each of the assets. In some examples, the system may determine, for each of the assets in the asset inventory 202, where in a network topology the asset is located and the processes that the asset supports. In some implementations, a particular asset may have multiple categorizations. The system may determine priority information for an asset, type of data store on an asset, or both, using the location of the asset in the network topology.

The system analyzes each of the assets in the asset inventory 202 to determine a priority of each of the assets, e.g., how important the assets are to the entity, the criticality or sensitivity of data stored on or access with the asset, etc. In some examples, the system may receive priority information from a user. The system may analyze the types of the assets, the data stored on the assets, etc., to determine the priorities of the assets in the asset inventory 202. The system may use any appropriate method to determine priority information for the assets.

The system determines a network layout and interactions between the assets in the asset inventory 202 to create an asset topology 206, such as the asset topology 100. The asset topology 206 represents which assets are connected to or have access to which of the other assets in the asset inventory 202.

In some implementations, the system may update the priorities and the categories of the assets in the asset inventory 202 based on interdependencies identified in the asset topology 206. For instance, the system updates the asset categorization 204 using information from the asset topology 206. When the system assigns a particular asset, such as a server, a low priority and an application executing on the server a high priority when first creating the asset categorization 204, the system may analyze the asset topology 206 and update the priority of the server to be medium or high priority because the high priority application is executing on the server.

The system receives threat data 208 from multiple sources, e.g., public, private, internal collection, or a combination of two or more of these. The system may receive some of the threat data 208 from data feeds. The system may contextualize some of the threat data 208, e.g., using information about the assets in the asset inventory 202. For example, the system may determine which threat data 208 corresponds to an asset in the asset inventory 202 and discard any threat data which does not correspond to at least one of the assets in the asset inventory 202.

In some implementations, the system may filter out threat data by data type. For instance, the system may keep the threat data 208 that identifies exploits 210, incidents 216, and adversary tactics, techniques, and procedures (TTPs) 222.

The exploits 210 may include information related to system vulnerabilities or the tools used to take advantage of a particular vulnerability by techniques of a threat actor. One example of exploit information may include identification or characterization of a vulnerability, e.g., of an asset or a group of assets. In some examples, a vulnerability may be specific to a particular combination of assets. For example, a vulnerability may indicate that a particular software application, e.g., and version of the software application, when installed on a specific device or type of device has a particular vulnerability.

Vulnerabilities may include information about security vulnerabilities identified by independent research teams, internal teams, or security vendors. The security vulnerabilities may indicate particular vulnerabilities for a hardware device, an operating system, an application, or a version of an application, e.g., particular to a specific operating system or hardware device.

The system may analyze the threat data 208 to determine which exploits leveraged 212 in the past, e.g., to determine historical data that indicates vulnerabilities used in computer based attacks in the past. The system may analyze the threat data 208 to determine a severity of the exploits 214. For instance, the system may use the historical data to determine the severity of the past computer based attacks, an estimated severity of a particular exploit given the assets in the asset inventory 202 that are vulnerable to the particular exploit, or both.

The incidents 216 may be discrete instances of Indicators, described below, that affect an entity. Data describing one of the incidents 216 may include time-related information, e.g., when the incident occurred, parties involved, assets affected, impact assessment, related Indicators, related Observables, leveraged TTP, attributed Threat Actors, intended effects, nature of compromise, response Course of Action (COA) requested, response COA taken, confidence in characterization of the incident, handling guidance, source of the Incident information, and log of actions taken, among other types of data about the incident. Observables, Threat Actors, and TTPs are described in more detail below.

Indicators of compromise (IOC) may include certain observable conditions as well as contextual information about patterns of those observable conditions and how and when a pattern should be acted on. The contextual information may represent artifacts or behaviors of interest within a cyber-security context or both. The patterns of the observable conditions may be mapped to related TTP context information, include relevant metadata about confidence in the indicator's assertion, handling restrictions, valid time windows, likely impact, sightings of the information indicator, structured test mechanisms for detection, related campaigns, or suggested COA, or both related TTP context information and relevant metadata.

The system may analyze the incidents 216 to determine a frequency of exploit utilization, a frequency of exploit success, or both 218. The system may analyze the incidents to determine a probability of attack severity, a probability of attack success, or both 220. For example, the system may use the incidents 216 to create the asset threat model 228 and to determine potential paths an adversary's device may take in the asset topology 206 during a particular simulated attack.

The adversary tactics, techniques, and procedures (TTPs) 222 may include information about how threat actors, described below, operate and perform their adversarial actions. An example tactic may include the use of malware to steal credit card credentials. An example technique may include sending emails to potential victims that include malicious attachments, e.g., used to capture credit card information. An example procedure may include research to identify potential targets for malicious email.

The system may use the TTPs 222 to determine likely paths of compromise 224 through the asset topology 206, a prioritization of attack paths 226, or both. For instance, the system may use the asset topology 206 and the TTPs 222 to determine, for each asset that has been compromised during a particular simulation, which other assets are directly connected to the compromised asset and a priority for each of those assets that indicates whether an adversary's device would target or target and compromise the asset. The system may then select the highest priority asset from the other assets and continue the simulation, e.g., by determining the additional assets directly connected to the highest priority asset and priorities for those additional assets. The system may determine the priorities using a probability that the asset will be compromised based on vulnerabilities of the asset, an intended result of the attack, e.g., whether or not there is a particular asset to which the adversary wants access, or other data representative of which assets are most likely compromised. The system may select an asset from the other assets using Markov Chain Monte Carlo methods and move from the current asset to the selected asset while creating a path during a particular attack simulation.

The system uses the exploits 210, the incidents 216, the TTPs, and network architecture and asset interdependencies data from the asset topology 206 to generate the asset threat model 228. The system may use the asset threat model 228 for a particular simulation or multiple simulations. The system may use any appropriate method to simulate an attack using the asset threat model 228, e.g., the system may perform adaptive Markov Chain Monte Carlo (MCMC) methods. The system may receive new threat data 208 and update the asset threat model 228 using the new threat data.

The system may identify a particular asset target for a simulation and determine a path from an external facing asset to the particular asset target using the asset threat model 228. In some examples, the system may perform multiple simulations using a particular asset threat model 228 with the same target asset and simulate changes to the asset topology 206 to determine how the changes to the asset topology 206 affect a probability that the target asset will be compromised. For instance, the system may determine that removing particular connections between assets in the asset topology 206 or adding particular assets to the asset topology 206, in particular locations, reduces the probability that the target asset will be compromised and provide a recommendation regarding the changes.

In some implementations, the system may perform multiple simulations using different threat data 208. The different threat data 208 may represent changes to the threat data 208 over time as solutions to vulnerabilities are identified and new vulnerabilities are determined, among other changes to the threat data 208. The system may determine how changes in the threat data, e.g., the exploits 210, the incidents 216, the TTPs 222, or a combination of these, affect paths of compromise through the asset topology 206 over time.

In some implementations, the system may use categorization information for the assets to determine potential attack paths for all the assets within a particular category or group of categories. The system may use the categorization information to compare relative security of assets in one category compared to assets in another category. The system may use categorization information to determine the security of solutions for one category of assets compared to another.

In implementations where categorization information corresponds with business functionality, the system may use simulation information and categorization information to determine which business functions have the highest probability of risk, e.g., and the highest probability of a disruption to the business function. In some implementations, the system may create a category to negative outcome mapping that indicates the probability of an asset in the category being compromised. The system may determine a probability that a category of assets will be compromised using the probabilities of compromise of the assets in the category, e.g., by combining the probabilities for the assets in a particular category. The probability that a category of assets will be compromised may represent a probability of a disruption to a particular business function.

The system may correlate simulations to determine trends over time. The trends may indicate particular assets in the asset topology 206 that have a high probability of compromise, a high probability of being targeted, or both. The system may use the trends, or the changes to the asset threat model 228 over time, to determine the changes to the asset topology 206 that are most likely to be effective over time given changes to the threat data 208, the assets that are most likely to be compromised, the assets most likely to be compromised in a particular priority group, e.g., high, medium, or low, or a combination of two or more of these.

Observables may be properties or measurable events pertinent to the operation of computers and networks. Some examples of observables may include information about a file, e.g., name, hash, or size; a registry key value; a service being started; or a Hypertext Transfer Protocol (HTTP) request being sent.

Threat actors may include characterizations of malicious actors that represent a cyber-threat and may include potential identity, location, specific techniques used by, presumed intent of, and other observed historical behavior for the respective threat actor. Threat actors may be linked to TTPs, threat campaigns, or both, which were used by the respective threat actor or other threat actors that may be or are known to have been associated with the respective threat actor.

Threat campaigns may relate threat actors to particular indicators of compromise (IOC), exploits, TTP, or any combination of two or more of these. For instance, a threat campaign may indicate the particular procedures, and the indicators used to determine those procedures, used by a particular threat actor to compromise one or more entities.

Courses of action (COA) may include recommended actions to mitigate or remediate risks presented by IOC or motivation of threat actors or threat campaigns. For instance, a COA may be corrective, e.g., to fix an exploited vulnerability, or preventative, e.g., to fix a potential vulnerability or a vulnerability that has not yet been exploited, for the particular entity or another entity.

Figure 3:
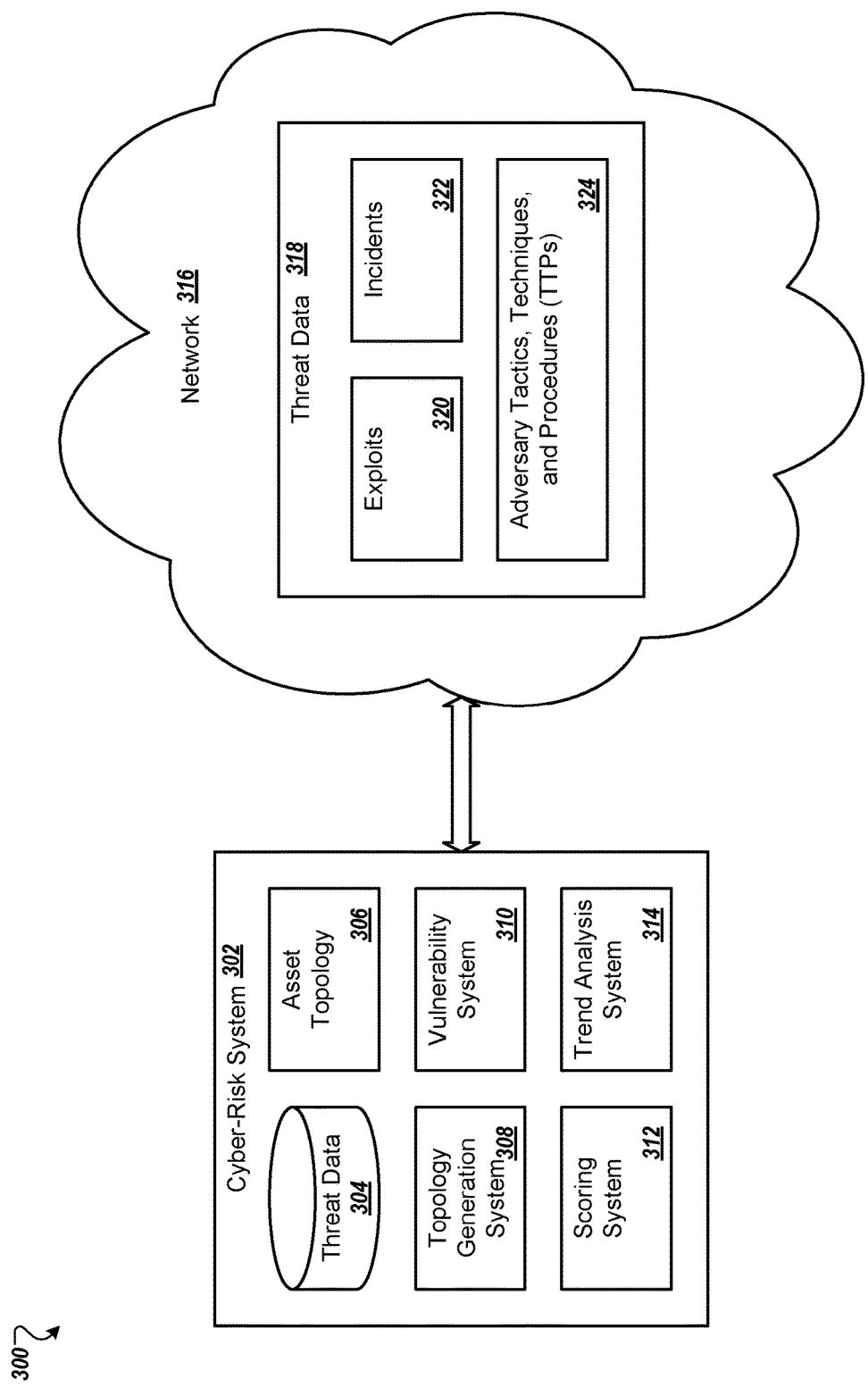
FIG. 3 shows an environment in which a cyber-risk system uses threat data and an asset topology to simulate attacks on the assets in the asset topology.

FIG. 3 shows an environment 300 in which a cyber-risk system 302 uses threat data 304 and an asset topology 306 to simulate attacks on the assets in the asset topology 306, probabilities that assets will be targeted, probabilities that assets will be compromised, or a combination of these. The cyber-risk system 302 may receive the threat data 304 as described in more detail below.

The cyber-risk system 302 may include a topology generation system 308 that receives an asset inventory and generates the asset topology 306 using the asset inventory and information about how the assets in the asset inventory connect and interact with each other. For example, the topology generation system 308 may receive information about relationships between the assets, e.g., the connections and interactions, and generate the asset topology using the received information. The topology generation system 308 may receive the information about the relationships between the assets from a computer operated by a user or another data source, e.g., that defines the relationships. The topology generation system 308 may use any appropriate method to generate the asset topology 306. The assets in the asset inventory and the asset topology 306 are computer-related assets.

A vulnerability system 310 uses the threat data 304 and the asset topology 306, potentially in conjunction with a scoring system 312, to simulate paths though the asset topology 306. The paths may represent potential routes through the asset topology 306 that a device operated by an adversary, e.g., an adversary's device, may take to gain access to the assets on the path. The device may be one of the assets in the asset topology 306 when the adversary has physical access to the device. The device may be another device that is not represented in the asset topology 306, e.g., when the adversary uses the device to connect to an external facing asset in the asset topology 306 using a wired network, a wireless access point, or both.

The vulnerability system 310 identifies an asset that is currently being analyzed in the asset topology 306, the subsequent assets that directly connect to the current asset, and the vulnerabilities of those subsequent assets. The scoring system 312 uses information about the vulnerabilities of the subsequent assets and other threat data to determine probabilities that each of the subsequent assets will be targeted by the device operated by the adversary, compromised by the device operated by the adversary, or both. The vulnerability system 310 and the scoring system 312 may perform similar analysis for an entry point asset, e.g., the first asset in the asset topology 306 which is compromised.

The scoring system 312 may receive information about the vulnerabilities of the subsequent assets from the vulnerability system 310. The scoring system 312 receives the other threat data from the threat data 304. The other threat data may include incidents or TTPs or both which the scoring system 312 uses to determine a probability an asset will be targeted or compromised. In some examples, the scoring system 312 may generate a score that represents a probability that an asset may be targeted for attack, compromised, or both.

In some implementations, after the vulnerability system 310 determines a path through the asset topology 306, the scoring system 312 may determine final probabilities or scores for each of the assets on the path. For a particular asset on the path, the scoring system 312 may use the probabilities or scores for each of the assets on the path that occur before the particular asset to determine the final probability or score for the particular asset. For example, when a path includes five assets, the first asset has a fifteen percent probability of being compromised, the second asset has a sixteen percent probability of being compromised, and the third asset has a six percent probability of being compromised, the scoring system 312 may determine that the third asset has a final probability of being compromised of 1.44% (15%*16%*6%=1.44%).

The vulnerability system 310 may use Markov Chain Monte Carlo methods to generate multiple different simulations with the same set of threat data 304 and the same asset topology 306. For example, the vulnerability system 310 performs many simulations to determine multiple different paths through the asset topology 306. The use of Markov Chain Monte Carlo methods enables the vulnerability system 310 to select different entry point assets during different simulations instead of selecting the same entry point asset for each simulation, e.g., instead of selecting the asset with the highest probability of being compromised for each simulation. Similarly, for simulations when the vulnerability system 310 selects the same entry point asset, the vulnerability system 310 uses Markov Chain Monte Carlo methods to generate different paths through the asset topology 306 for at least some of the simulations.

When the threat data 304, the asset topology 306, or both, change, the vulnerability system 310 and the scoring system 312 may generate paths through the asset topology 306 using the changed data. The paths generated with the changed data may be similar to or the same as some of the paths generated using the original data. The vulnerability system 310 uses Markov Chain Monte Carlo methods to generate paths using the changed data and may generate some of the same paths, or all of the same paths, as the paths generated with the original data but with different quantities of occurrences of the paths. For example, when the changed threat data indicates that a particular asset is more vulnerable than the original threat data, the vulnerability system 310 may perform more simulations with paths that include that particular asset than the quantity of simulations with paths that included that particular asset previously, assuming the quantity of simulations performed with each of the data sets is the same and that there are not changes to the asset topology 306.

The cyber-risk system 302 includes a trend analysis system 314 that analyzes data from multiple computer-based attack simulations. The data may include the paths generated during the simulations, probabilities of being targeted, probabilities of compromise, vulnerabilities identified, vulnerabilities used during the simulation, e.g., with a highest probability of compromise for an asset, or a combination of these. The trend analysis system 314 determines trends in the data to identify paths frequently used, e.g., over time with changing threat data or asset topology or both, assets with a high probability of being compromised over time, high priority assets with a high or the highest probability of being compromised over time, or other trends in the data.

In some implementations, the topology generation system 308 or an asset selection system 316 may determine changes to the asset topology 306, e.g., may simulate changes before the changes are implemented by an entity. For instance, the asset selection system 316 may determine a recommendation of how the asset topology 306 should be changed to reduce a probability that a particular asset in the asset topology 306 may be compromised. In some examples, the asset selection system 316, in conjunction with the vulnerability system 310, may determine whether or not and how a change to the asset topology 306 affects probabilities of compromise of the assets in the asset topology 306. The change may be the addition or removal of an asset, a location at which an asset is added to the asset topology 306, the addition or removal of a connection, or a change in a setting of an asset, to name a few examples. The asset selection system 316 may determine what particular assets should be added to the asset topology 306, e.g., when comparing two different assets.

A network 318, such as a local area network (LAN), wide area network (WAN), the Internet, or a combination thereof, connects the cyber-risk system 302 with sources of threat data 320. The threat data 320 may include, among other types of threat data, exploits 322, incidents 324, and adversary tactics, techniques, and procedures (TTPs) 326.

The cyber-risk system 302 may obtain the threat data 320 from publically accessible sources, third party, e.g., proprietary, sources, or both. The cyber-risk system 302 may collect or generate some of the threat data 320 internally. In some examples, the cyber-risk system 302 may gather some of the threat data 320 from a data feed, e.g., an Internet feed.

Figure 4:
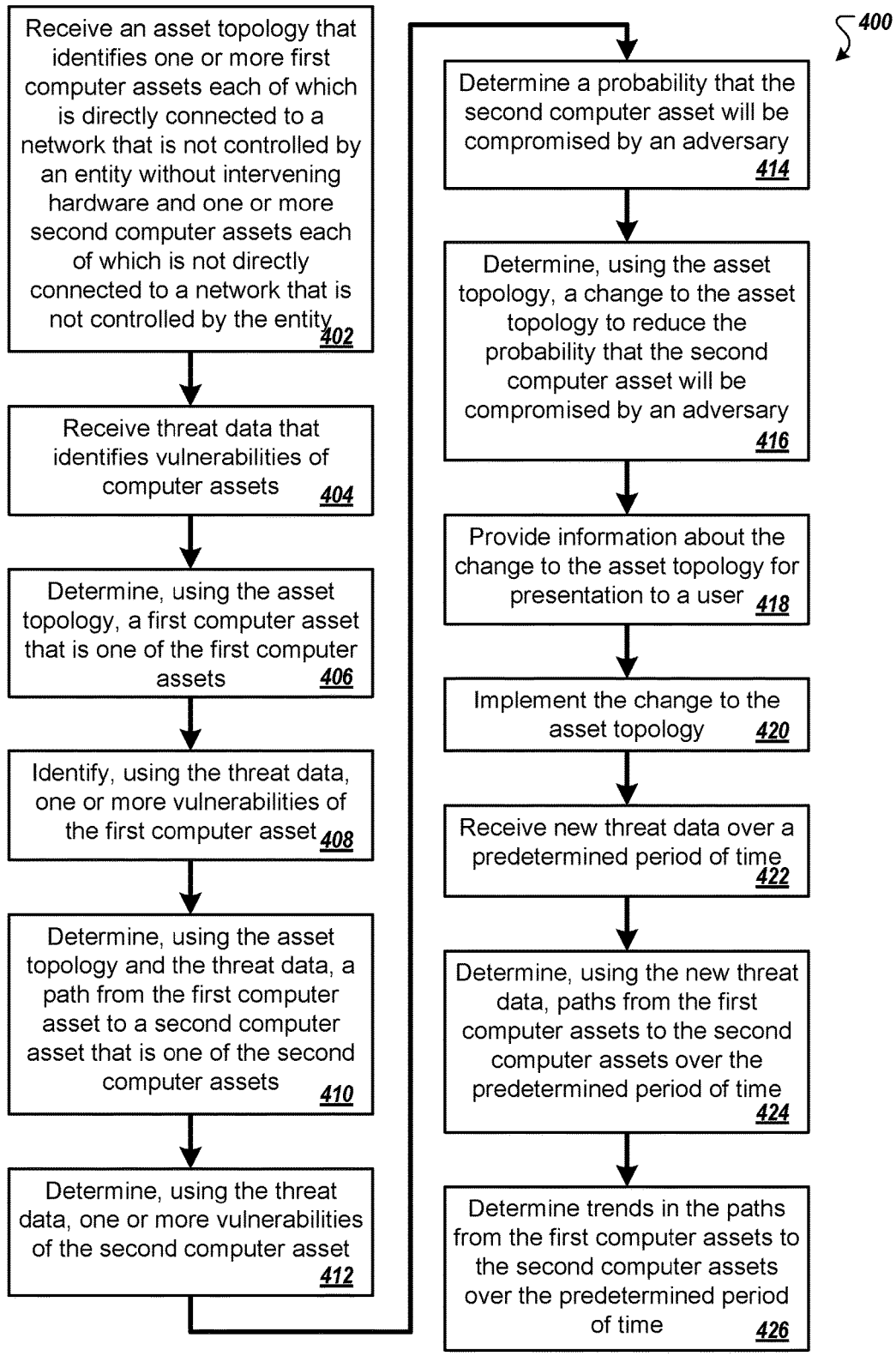
FIG. 4 is a flow diagram of a process for determining vulnerabilities of computer assets.

FIG. 4 is a flow diagram of a process 400 for determining vulnerabilities of computer assets. For example, the process 400 can be used by the cyber-risk system 302 from the environment 300.

The system receives an asset topology that identifies one or more first computer assets each of which is directly connected to a network that is not controlled by an entity without intervening hardware and one or more second computer assets each of which is not directly connected to a network that is not controlled by the entity (402). In some implementations, some of the first computer assets are external facing assets. The second computer assets are not external facing assets. In some implementations, some of the first computer assets are physical assets to which an adversary may gain physical access, e.g., a computer. In these implementations, the second computer assets may be assets that are not physical assets or physical assets to which an adversary cannot gain physical access.

The system may receive the asset topology from a computer, e.g., a database. In some examples, the system may receive an asset inventory and use the asset inventory, potentially with additional information about the assets, to create the asset topology.

The system receives threat data that identifies vulnerabilities of computer assets (404). The system may subscribe to a threat data feed and receive some of the threat data from the data feed. The system may search for and find some of the threat data on a network, e.g., the Internet. In some implementations, the system may receive some of the threat data from an internal source, e.g., controlled by the same entity that controls the system.

The system determines, using the asset topology, a first computer asset that is one of the first computer assets (406). For instance, the system may use the asset topology and the threat data to perform a simulated attack on the assets in the asset topology. The system selects the first computer as an entry point in the simulated attack. The first computer may be an external facing asset, e.g., connected to a network not controlled by the entity or that broadcasts a wireless connection point, an asset to which an adversary main gain physical access, or both. In some examples, the first computer may be an asset with a high degree of human access. For example, the first computer may be a workstation, e.g., on a desk at an office of the entity, or a server, e.g., with remote shell access such as with a secure shell session.

In some implementations, the system may determine an adversary motivation when determining the first computer asset. The system may prioritize simulation attempts on attacking one or more first computer assets based on the determined motivation. For instance, the system may use the threat data to determine the adversary motivation, e.g., an intended target, either initial or final target, for the adversary or the types of assets the adversary may compromise during an attack. The system may determine an adversary motivation for an industry, an entity, e.g., organization, set of threat data, or combination of two or more of these. The system may determine that the first asset is an asset that must be targeted and compromised for the adversary to accomplish their motivation. The adversary motivation may be for a particular simulation or a group of simulations.

The system identifies, using the threat data, one or more vulnerabilities of the first computer asset (408). For instance, the system uses data about exploits to determine the vulnerabilities of the first computer asset.

In some implementations, the system may determine a probability of compromise for the first computer asset using the vulnerabilities of the first computer asset. The system may use data about incidents, data about TTPs, or both when determining the probability of compromise for the first computer.

The system determines, using the asset topology and the threat data, a path from the first computer asset to a second computer asset that is one of the second computer assets (410). For example, as described in more detail below with reference to FIG. 5, the system determines all of the assets directly connected to the first computer asset and which of those assets may be compromised by an adversary's device. The system creates a path, moving from one computer asset to another to create the path from the first computer asset to the second computer asset. The second computer asset may be an intended destination for the attack simulation, e.g., which may contain data potential adversary may want to access, or may be an end destination on the path, e.g., from which the system cannot access any other assets to which the system did not already gain access when creating the path during the attack simulation.

In some implementations, the system may determine assets that correspond to the adversary's motivation for a particular simulation and use those assets when determining the path from the first computer asset to the second computer assets. For instance, the system may determine organizational assets that support a particular business function, e.g., which may be the target of the adversary's motivation. The system may determine the component parts of the determined organizational assets, e.g., the software or hardware components of those assets. The system may determine attack channels and access methods for the component parts of the determined organizational assets and use those attack channels and access methods to determine the path from the first computer asset to the second computer asset.

In some examples, the path may be from a first user account to a second user account. For instance, the system may determine a path between multiple user accounts, which may have different privileges and may be for the same application or different applications. The accounts may be hosted on a single server or different servers. The application, whether a single application used for both accounts or different applications, may be hosted on a single server or different servers. In some implementations, the system may perform an attack simulation using a single adversary device, e.g., workstation, or multiple adversary devices, multiple compromised physical assets, or both.

The system determines, using the threat data, one or more vulnerabilities of the second computer asset (412). For example, the system uses the threat data to determine the vulnerabilities of the second computer asset.

The system determines a probability that the second computer asset will be compromised by an adversary (414). For instance, the system uses the threat data to determine a quantity of times each of the vulnerabilities has been known to be used, a quantity of times each of the vulnerabilities has provided access to the type of asset of the second computer asset, or both, to determine the probability the second computer asset will be compromised by a device operated by the adversary.

The system determines, using the asset topology, a change to the asset topology to reduce the probability that the second computer asset will be compromised by an adversary (416). The system may use the vulnerabilities of the second computer asset to determine the change to the asset topology. The system may determine a change to the asset, e.g., a change to a setting or an update to software, or a change to the assets or connections in the asset topology, e.g., the removal of a connection, addition of an asset, removal of an asset, or a combination of these.

In some implementations, the change to the asset topology may be the addition of an asset that is not directly connected to the second computer asset. For instance, the system may determine that adding a firewall after the first computer asset will reduce the probability that the second computer asset will be compromised.

The system provides information about the change to the asset topology for presentation to a user (418). For instance, the system sends the information about the change to a computer operated by an administrator for the entity that uses the assets in the asset topology. The system, or the computer operated by the administrator, may generate instructions for the presentation of the information about the change to the asset topology.

The system implements the change to the asset topology (420). In some examples, the system may update a software application. The system may submit an order for a new asset. The system may send instructions for the removal of an asset from the entity's assets, e.g., that the asset be physically removed, disconnected, or turned off. In some examples, the system may download or cause the downloading of a new software application, e.g., as a new asset for the entity, and install or cause the installation of the software application on an existing hardware asset of the entity. In some implementations, the system may provide instructions to another computer for implementation of the change to the asset topology.

The system receives new threat data over a predetermined period of time (422). For example, the system receives the new threat data over the course of days, weeks, months, or years. The system may receive the new threat data from any appropriate source, such as the sources discussed above.

The system determines, using the new threat data, paths from the first computer assets to the second computer assets over the predetermined period of time (424). For instance, during the predetermined time, the system may perform additional attack simulations, similar to the one described above, e.g., steps 408 through 414 or steps 408 through 410.

The system determines trends in the paths from the first computer assets to the second computer assets over the predetermined period of time (426). For example, the system determines how changes to the threat data, changes to the asset topology, or both, affect the paths from the first computer assets to the second computer assets.

In some implementations, the system may determine probabilities of compromise for each of the assets in an asset inventory. The system may weight the probabilities using a categorization or prioritization, or both, of each of the assets. The system may generate instructions for presentation of a list of the assets and the corresponding probabilities of compromise in a user interface. The presentation may include information about the paths of compromise used to access each of the assets, e.g., the path with the highest probability of being used, all of the paths, or all of the paths and corresponding probabilities of being used. The instructions may include instructions for presentation of the path information on the same screen in the user interface as the list of the assets or a different screen in the user interface as the list of the assets.

In some implementations, the system may receive a request for a probability of compromise for a single asset in an asset topology. The system may generate instructions for a presentation of a user interface with information about the probability of compromise for the single asset, and optionally the paths of compromise for the asset. In some implementations, the system may receive a request for probabilities of compromise for all assets in an asset topology and, in response, generate a list of the assets and the corresponding probabilities.

The order of steps in the process 400 described above is illustrative only, and determining the vulnerabilities of the computer assets can be performed in different orders. For example, the system may receive the threat data and then receive the asset topology. In some examples, the system may determine trends in the paths from the first computer assets to the second computer assets and then determine a change to the asset topology, provide information about the trends for presentation to a user, or both. In some examples, the system may determine the vulnerabilities of the entry point assets and then select one of the entry point assets using the vulnerabilities, e.g., perform step 408 and then step 406.

In some implementations, the process 400 can include additional steps, fewer steps, or some of the steps can be divided into multiple steps. For example, the system may perform steps 402 through 414 without performing steps 416 through 426. In some examples, the system may perform steps 402 through 420. In some examples, the system may perform steps 402 through 414 and 422 through 426. In some examples, the system may perform steps 406 through 414.

In some implementations, a system may use the asset topology and the threat data to perform risk evaluation of changes in the asset topology. For instance, the system may determine one or more additional assets that can be added to the current assets in an asset topology and execute attack simulations using the additional assets to determine how the additional assets change the probabilities of compromise for the current assets. The system may determine one or more assets that can be removed from the current assets in an asset topology and execute attack simulations using the asset topology without the removed assets to determine how the removal of the assets changes the probabilities of compromise for the current assets that have not been removed. The system may determine whether or not the proposed changes should be implemented using the changes to the probabilities of compromise for the current assets.

In some implementations, the system may perform a simulation to determine a proposed change to the asset topology and then perform simulations with the proposed change to the asset topology implemented in the simulation. The system may perform the simulations with the implementation of the proposed change using the same threat data used to determine the proposed change, e.g., to determine changes in the probabilities of compromise. In some examples, the system may perform simulations with a proposed change that was identified by a user of the system, e.g., an employee of the entity. For instance, the system may receive input indicating a particular asset and a location in the asset topology at which the particular asset may be placed, and connections between the particular asset and current assets from the asset topology.

Figure 5:
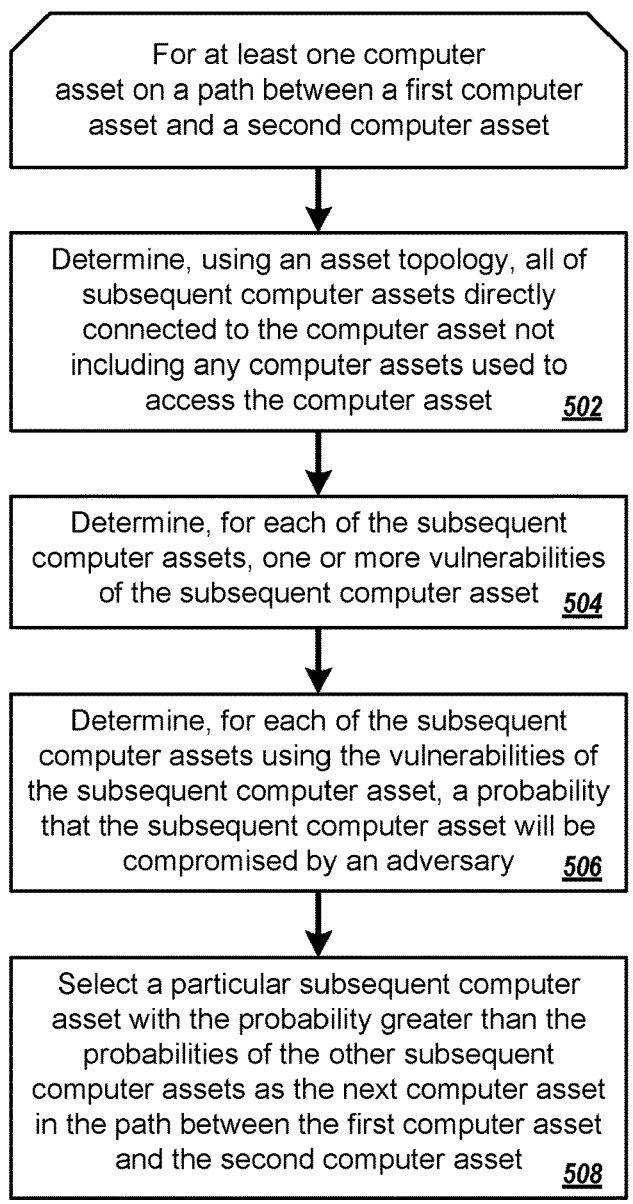
FIG. 5 is a flow diagram of a process for generating a path through an asset topology.

FIG. 5 is a flow diagram of a process 500 for generating a path through an asset topology. For example, the process 500 can be used by the cyber-risk system 302 from the environment 300.

For at least one computer asset on a path between a first computer asset and a second computer asset, the system determines, using an asset topology, all of subsequent computer assets directly connected to the computer asset not including any computer assets used to access the computer asset (502). For example, the system may determine the applications installed on the asset or the devices connected directly to the asset when the asset is a hardware asset. The devices connected directly to the asset may include devices connected to the asset with one or more wires or cables or with a wireless connection.

The system determines, for each of the subsequent computer assets, one or more vulnerabilities of the subsequent computer asset (504). For instance, the system uses threat data to determine the vulnerabilities of the subsequent computer assets. For a particular asset, the system may analyze the threat data to determine which documents in or subsets of the threat data indicate vulnerabilities of the particular asset.

The system determines, for each of the subsequent computer assets using the vulnerabilities of the subsequent computer asset, a probability that the subsequent computer asset will be compromised by an adversary (506). The system may use the threat data, e.g., incidents, adversary tactics, techniques, and procedures (TTPs), or both, to determine the probability that the subsequent computer asset will be compromised. In some examples, the system determines, for each of the vulnerabilities, a probability that the asset will be compromised and then determines an overall probability that the asset will be compromised by combining the individual probabilities, e.g., by multiplying the probabilities. The system may use scores that represent the probabilities that the asset will be compromised and combine the scores, e.g., by adding the scores.

In some implementations, the system may determine the probability that a particular asset will be compromised using the number of vulnerabilities of the asset, the severity of each of the vulnerabilities, a number of simulations in which the asset is analyzed or compromised, or two or more of these. The system may determine, for each vulnerability of a particular asset, the product of the vulnerability severity and the number of simulations in which the vulnerability was compromised. The system may add these product values together to determine the overall probability of compromise for the particular asset. The system may use any appropriate method to determine an overall probability that the asset will be compromised.

The system selects a particular subsequent computer asset with the probability greater than the probabilities of the other subsequent computer assets as the next computer asset in the path between the first computer asset and the second computer asset (508). In some examples, the system may use Markov Chain Monte Carlo simulation to select the particular subsequent computer asset, e.g., so that some of the paths generated during the simulations are different to determine the risk of different assets in an asset topology being compromised, targeted, or both.

In some implementations, the process 500 can include additional steps, fewer steps, or some of the steps can be divided into multiple steps. For example, the system may perform the process 500 for multiple different assets in an asset topology. The system may perform the process iteratively until server layers, in a network of an asset topology, or several devices within the same layer, have been breached.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 6:
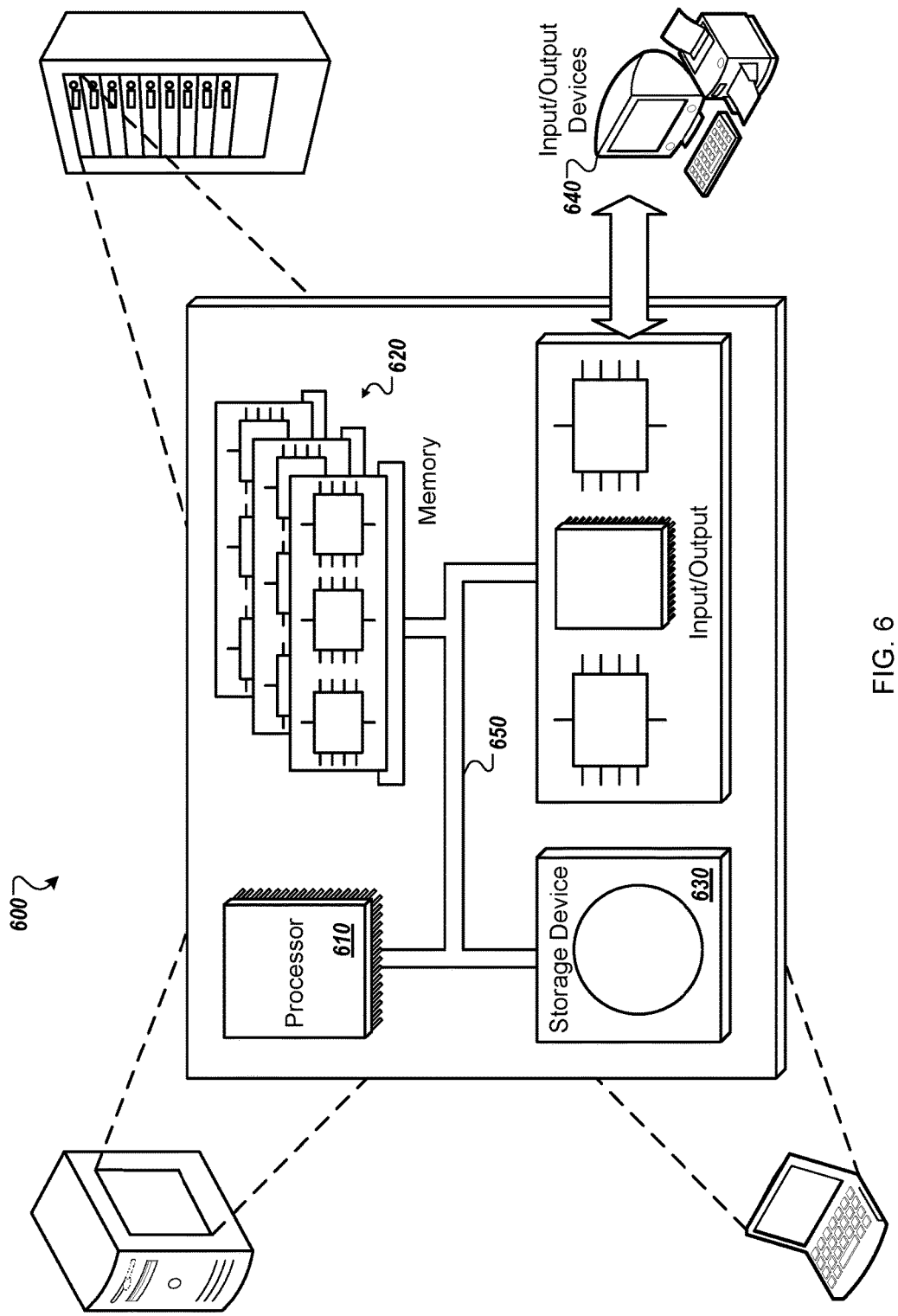
FIG. 6 is a block diagram of a computing system that can be used in connection with computer-implemented methods described in this document.

An example of one such type of computer is shown in FIG. 6, which shows a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
    a data processing apparatus; and
    a non-transitory computer readable storage medium in data communication with the data processing apparatus and storing instructions executable by the data processing apparatus and upon such execution cause the data processing apparatus to perform operations comprising:
        identifying, using threat data that identifies vulnerabilities of computer-related assets, one or more first vulnerabilities of a first computer-related asset that is a) identified by an asset topology that i) identifies an entity's computer-related assets including one or more first computer-related assets each of which is a potential entry point for an attack simulation and one or more second computer-related assets each of which is not a potential entry point for an attack simulation, and ii) how the computer-related assets are connected together and b) one of the first computer-related assets;
        in response to identifying the one or more first vulnerabilities of the first computer-related asset, determining, using the one or more first vulnerabilities, that a first probability that the first computer-related asset will be compromised by an adversary's device satisfies a threshold probability;
        in response to determining that the first probability that the first computer-related asset will be compromised by an adversary's device satisfies the threshold probability, determining, using the asset topology, a path from the first computer-related asset to a second computer-related asset that is one of the second computer-related assets identified by the asset topology;
        in response to determining the path from the first computer-related asset to the second computer-related asset, determining, using the threat data, one or more second vulnerabilities of the second computer-related asset;
        in response to determining the one or more second vulnerabilities of the second computer-related asset, determining, using the one or more second vulnerabilities of the second computer-related asset, a second probability that the second computer-related asset will be compromised by an adversary's device;
        in response to determining the second probability that the second computer-related asset will be compromised by an adversary's device, determining, using the asset topology and the threat data, a change to the asset topology to reduce the second probability that the second computer-related asset will be compromised by an adversary's device; and
        in response to determining the change to the asset topology to reduce the second probability that the second computer-related asset will be compromised by an adversary's device, implementing the change to the asset topology.

2. The system of claim 1, wherein determining, using the asset topology, the path from the first computer-related asset to a second computer-related asset that is one of the second computer-related assets identified by the asset topology comprises:
    determining, for each of two or more of the second computer-related assets using the asset topology, a path from the first computer-related asset to the second computer-related asset.

3. The system of claim 2, the operations comprising:
    receiving new threat data over a predetermined period of time;
    determining, using the new threat data, paths from the first computer-related asset to each of the two or more of the second computer-related assets over the predetermined period of time; and
    determining trends in the paths from the first computer-related asset to each of the two or more of the second computer-related assets over the predetermined period of time.

4. The system of claim 3, wherein determining the trends in the paths from the first computer-related asset to each of the two or more of the second computer-related assets over the predetermined period of time comprises determining a recurring path of compromise that has a high probability that one or more assets on the recurring path will be compromised by an adversary's device over at least a threshold value of times during the predetermined period of time.

5. The system of claim 3, the operations comprising:
determining, using the trends in the paths from the first computer-related asset to each of the two or more of the second computer-related assets, a probability that a particular second computer-related asset will be compromised by an adversary's device over the predetermined period of time that is greater than probabilities that the other computer-related assets in the two or more of the second computer-related assets will be compromised by an adversary's device over the predetermined period of time; and
determining, using the asset topology and the new threat data, a change to the asset topology to reduce the probability that the particular second computer-related asset will be compromised by an adversary's device.

6. The system of claim 5, the operations comprising:
providing information about the change to the asset topology for presentation to a user.

7. The system of claim 5, wherein:
determining, using the asset topology and the new threat data, the change to the asset topology to reduce the probability that the particular second computer-related asset will be compromised by an adversary's device comprises determining a software update to apply to one of the computer-related assets identified by the asset topology, the operations comprising:
applying the software update to the one of the computer-related assets identified by the asset topology.

8. The system of claim 1, wherein determining the path from the first computer-related asset to the second computer-related asset comprises:
determining, for each computer-related asset on the path between the first computer-related asset and the second computer-related asset, one or more vulnerabilities for the computer-related asset; and
determining, for the one or more vulnerabilities of the computer-related asset on the path between the first computer-related asset and the second computer-related asset, corresponding probabilities that the computer-related asset will be compromised by an adversary's device.

9. The system of claim 8, the operations comprising:
for at least one of the computer-related assets on the path between the first computer-related asset and the second computer-related asset:
determining, using the asset topology, all of subsequent computer-related assets directly connected to the computer-related asset not including any computer-related assets used to access the computer-related asset;
determining, for each of the subsequent computer-related assets, one or more vulnerabilities of the subsequent computer-related asset;
determining, for each of the subsequent computer-related assets using the vulnerabilities of the subsequent computer-related asset, a probability that the subsequent computer-related asset will be compromised by an adversary's device; and
selecting a particular subsequent computer-related asset with the probability greater than the probabilities of the other subsequent computer-related assets as the next computer-related asset in the path between the first computer-related asset and the second computer-related asset.

10. The system of claim 1, wherein determining the second probability that the second computer-related asset will be compromised by an adversary's device comprises:
determining, for each of the one or more second vulnerabilities of the second computer-related asset, a particular probability; and
combining all of the particular probabilities for the one or more second vulnerabilities of the second computer-related to determine the probability that the second computer-related asset will be compromised by an adversary's device.

11. The system of claim 1, the operations comprising analyzing one or more computer networks of the entity to determine the asset topology.

12. The system of claim 1, the operations comprising receiving the asset topology that identifies the one or more first computer-related assets each of which is directly connected to a network that is not controlled by the entity without intervening hardware and the one or more second computer-related assets each of which is not directly connected to a network that is not controlled by the entity.

13. The system of claim 12, wherein receiving the asset topology that identifies the entity's computer-related assets comprises receiving the asset topology and an identifier for at least one of the first computer-related assets that is directly connected to the Internet.

14. The system of claim 12, wherein receiving the asset topology that identifies the entity's computer-related assets comprises receiving the asset topology and an identifier for at least one of the first computer-related assets that is a wireless router.

15. The system of claim 1, the operations comprising:
determining, for each of the computer related assets, a category to which the computer related asset belongs;
determining, for a particular category from the determined categories, paths from an external facing asset to each of the assets in the category; and
determining, using the paths from the external facing asset to each of the assets in the category, a category probability of compromise for the particular category.

16. The system of claim 15, the operations comprising:
comparing the category probability of compromise for the particular category with a second category probability of compromise for a second category;
ranking the particular category and the second category using the category probability of compromise and the second category probability of compromise; and
implementing a change to the asset topology for a computer-related asset in a higher ranked category from the particular category and the second category.

17. The system of claim 1, the operations comprising:
determining a particular computer related asset that is a potential target of an attack by the adversary's device, wherein determining the path from the first computer-related asset to the second computer-related asset that is one of the second computer-related assets comprises determining a path from the first computer related asset to the particular computer related asset.

18. The system of claim 1, the operations comprising:
determining a type of computer-related assets that are a potential target of an attack by the adversary's device, wherein determining the path from the first computer-related asset to the second computer-related asset that is one of the second computer-related assets comprises determining a path from the first computer related asset to the second computer-related asset that includes at least one computer related asset of the type of computer related assets that are a potential target of the attack.

19. The system of claim 18, wherein determining the type of computer-related assets that are the potential target of an attack by the adversary's device comprises determining the type of computer-related assets that are the potential target of an attack by the adversary's device using the threat data.

20. The system of claim 1, the operations comprising: determining a type of computer-related assets that are a potential target of an attack by the adversary's device, wherein determining the path from the first computer-related asset to the second computer-related asset that is one of the second computer-related assets comprises determining a path from the first computer related asset to the second computer-related asset that includes only computer-related asset of the type of computer-related assets that are a potential target of the attack, both the first computer-related asset and the second computer-related asset being of the type of computer-related assets that are a potential target of the attack.

21. The system of claim 1, the operations comprising receiving, for each computer-related asset in a plurality of computer-related assets, threat data that indicates an identified computer vulnerability for the computer-related asset, wherein the plurality of computer-related assets includes the first computer-related asset that is a potential entry point for an attack simulation.

22. A computer-implemented method comprising:
identifying, using threat data that identifies vulnerabilities of computer-related assets, one or more first vulnerabilities of a first computer-related asset that is a) identified by an asset topology that i) identifies an entity's computer-related assets including one or more first computer-related assets each of which is a potential entry point for an attack simulation and one or more second computer-related assets each of which is not a potential entry point for an attack simulation, and ii) how the computer-related assets are connected together and b) one of the first computer-related assets;

in response to identifying the one or more first vulnerabilities of the first computer-related asset, determining, using the one or more first vulnerabilities, that a first probability that the first computer-related asset will be compromised by an adversary's device satisfies a threshold probability;

in response to determining that the first probability that the first computer-related asset will be compromised by an adversary's device satisfies the threshold probability, determining, using the asset topology, a path from the first computer-related asset to a second computer-related asset that is one of the second computer-related assets identified by the asset topology;

in response to determining the path from the first computer-related asset to the second computer-related asset, determining, using the threat data, one or more second vulnerabilities of the second computer-related asset;

in response to determining the one or more second vulnerabilities of the second computer-related asset, determining, using the one or more second vulnerabilities of the second computer-related asset, a second probability that the second computer-related asset will be compromised by an adversary's device;

in response to determining the second probability that the second computer-related asset will be compromised by an adversary's device, determining, using the asset topology and the threat data, a change to the asset topology to reduce the second probability that the second computer-related asset will be compromised by an adversary's device; and in response to determining the change to the asset topology to reduce the second probability that the second computer-related asset will be compromised by an adversary's device, implementing the change to the asset topology.

23. A non-transitory computer readable storage medium storing instructions executable by a data processing apparatus and upon such execution cause the data processing apparatus to perform operations comprising:
identifying, using threat data that identifies vulnerabilities of computer-related assets, one or more first vulnerabilities of a first computer-related asset that is a) identified by an asset topology that i) identifies an entity's computer-related assets including one or more first computer-related assets each of which is a potential entry point for an attack simulation and one or more second computer-related assets each of which is not a potential entry point for an attack simulation, and ii) how the computer-related assets are connected together and b) one of the first computer-related assets;

in response to identifying the one or more first vulnerabilities of the first computer-related asset, determining, using the one or more first vulnerabilities, that a first probability that the first computer-related asset will be compromised by an adversary's device satisfies a threshold probability;

in response to determining that the first probability that the first computer-related asset will be compromised by an adversary's device satisfies the threshold probability, determining, using the asset topology, a path from the first computer-related asset to a second computer-related asset that is one of the second computer-related assets identified by the asset topology;

in response to determining the path from the first computer-related asset to the second computer-related asset, determining, using the threat data, one or more second vulnerabilities of the second computer-related asset;

in response to determining the one or more second vulnerabilities of the second computer-related asset, determining, using the one or more second vulnerabilities of the second computer-related asset, a second probability that the second computer-related asset will be compromised by an adversary's device;

in response to determining the second probability that the second computer-related asset will be compromised by an adversary's device, determining, using the asset topology and the threat data, a change to the asset topology to reduce the second probability that the second computer-related asset will be compromised by an adversary's device; and in response to determining the change to the asset topology to reduce the second probability that the second computer-related asset will be compromised by an adversary's device, implementing the change to the asset topology.

24. The method of claim 22, wherein determining, using the asset topology, the path from the first computer-related asset to a second computer-related asset that is one of the second computer-related assets identified by the asset topology comprises:

determining, for each of two or more of the second computer-related assets using the asset topology, a path from the first computer-related asset to the second computer-related asset.

25. The method of claim 24, comprising:
receiving new threat data over a predetermined period of time;
determining, using the new threat data, paths from the first computer-related asset to each of the two or more of the second computer-related assets over the predetermined period of time; and
determining trends in the paths from the first computer-related asset to each of the two or more of the second computer-related assets over the predetermined period of time.

26. The method of claim 25, wherein determining the trends in the paths from the first computer-related asset to each of the two or more of the second computer-related assets over the predetermined period of time comprises determining a recurring path of compromise that has a high probability that one or more assets on the recurring path will be compromised by an adversary's device over at least a threshold value of times during the predetermined period of time.

27. The method of claim 25, comprising:
determining, using the trends in the paths from the first computer-related asset to each of the two or more of the second computer-related assets, a probability that a particular second computer-related asset will be compromised by an adversary's device over the predetermined period of time that is greater than probabilities that the other computer-related assets in the two or more of the second computer-related assets will be compromised by an adversary's device over the predetermined period of time; and
determining, using the asset topology and the new threat data, a change to the asset topology to reduce the probability that the particular second computer-related asset will be compromised by an adversary's device.

28. The method of claim 22, comprising:
determining, for each of the computer related assets, a category to which the computer related asset belongs;
determining, for a particular category from the determined categories, paths from an external facing asset to each of the assets in the category; and
determining, using the paths from the external facing asset to each of the assets in the category, a category probability of compromise for the particular category.

29. The method of claim 28, comprising:
comparing the category probability of compromise for the particular category with a second category probability of compromise for a second category;
ranking the particular category and the second category using the category probability of compromise and the second category probability of compromise; and
implementing a change to the asset topology for a computer-related asset in a higher ranked category from the particular category and the second category.

30. The method of claim 22, comprising:
determining a particular computer related asset that is a potential target of an attack by the adversary's device, wherein determining the path from the first computer-related asset to the second computer-related asset that is one of the second computer-related assets comprises determining a path from the first computer related asset to the particular computer related asset.

31. The method of claim 22, comprising:
determining a type of computer-related assets that are a potential target of an attack by the adversary's device, wherein determining the path from the first computer-related asset to the second computer-related asset that is one of the second computer-related assets comprises determining a path from the first computer related asset to the second computer-related asset that includes at least one computer related asset of the type of computer related assets that are a potential target of the attack.

32. The method of claim 31, wherein determining the type of computer-related assets that are the potential target of an attack by the adversary's device comprises determining the type of computer-related assets that are the potential target of an attack by the adversary's device using the threat data.

33. The method of claim 22, comprising:
determining a type of computer-related assets that are a potential target of an attack by the adversary's device, wherein determining the path from the first computer-related asset to the second computer-related asset that is one of the second computer-related assets comprises determining a path from the first computer related asset to the second computer-related asset that includes only computer-related asset of the type of computer-related assets that are a potential target of the attack, both the first computer-related asset and the second computer-related asset being of the type of computer-related assets that are a potential target of the attack.

\* \* \* \* \*